(12) United States Patent
Adesanya

(10) Patent No.: US 11,635,812 B2
(45) Date of Patent: Apr. 25, 2023

(54) WEARABLE COMPUTING APPARATUS FOR AUGMENTED REALITY, VIRTUAL REALITY AND ARTIFICIAL INTELLIGENCE INTERACTIONS, AND METHODS RELATING THERETO

(71) Applicant: Olaoluwa O. Adesanya, Redmond, WA (US)

(72) Inventor: Olaoluwa O. Adesanya, Redmond, WA (US)

( * ) Notice: Subject to any disclaimer, the term of this patent is extended or adjusted under 35 U.S.C. 154(b) by 0 days.

(21) Appl. No.: 17/487,919

(22) Filed: Sep. 28, 2021

(65) Prior Publication Data

US 2022/0091668 A1    Mar. 24, 2022

Related U.S. Application Data

(63) Continuation of application No. 16/909,280, filed on Jun. 23, 2020, now Pat. No. 11,163,360, which is a
(Continued)

(51) Int. Cl.
*G06F 3/01* (2006.01)
*G06F 3/038* (2013.01)
(Continued)

(52) U.S. Cl.
CPC .............. *G06F 3/014* (2013.01); *G06F 3/016* (2013.01); *G06F 3/017* (2013.01); *G06F 3/0383* (2013.01);
(Continued)

(58) Field of Classification Search
CPC .......... G06F 3/014; G06F 3/016; G06F 3/017; G06F 1/163; G06F 1/1686; G06F 1/1694; G06F 2203/0331
See application file for complete search history.

(56) References Cited

U.S. PATENT DOCUMENTS

| 6,701,296 B1 | 3/2004 | Kramer et al. |
| 9,104,271 B1 | 8/2015 | Adams et al. |

(Continued)

FOREIGN PATENT DOCUMENTS

WO    WO 2016/189372 A2    12/2016

OTHER PUBLICATIONS

WO, PCT/US2018/067263 ISR and Written Opinion, dated May 16, 2019.
EP, 18895000.0 Extended Search Report, dated Aug. 17, 2021.

*Primary Examiner* — Michael J Eurice
(74) *Attorney, Agent, or Firm* — One LLP

(57) ABSTRACT

Wearable computing apparatuses, which can be adapted to be worn on a user's hand, are provided for augmented reality, virtual reality, and artificial intelligence interactions. Generally, the wearable computing apparatus can include a first subassembly comprising one or more processors, non-transitory memory for storing instructions, at least one haptic motor, and a first set of sensors configured to measure positional characteristics associated with a user's hand. The wearable computing apparatus can further comprise a second subassembly removably coupled to the first subassembly, the second subassembly including a plurality of leads each of which is attached to a finger and comprises a distal (Continued)

portion that houses a haptic motor and a second set of sensors. The second set of sensors is configured to measure positional characteristics associated with the user's fingers.

17 Claims, 14 Drawing Sheets

Related U.S. Application Data continuation of application No. PCT/US2018/067263, filed on Dec. 21, 2018.

(60) Provisional application No. 62/610,843, filed on Dec. 27, 2017.

(51) Int. Cl.
  *G06F 3/14* (2006.01)
  *G06F 3/041* (2006.01)
  *G06F 3/16* (2006.01)
  *H04N 5/225* (2006.01)

(52) U.S. Cl.
  CPC ............... *G06F 3/14* (2013.01); *G06F 3/041* (2013.01); *G06F 3/167* (2013.01); *G06F 2203/0384* (2013.01); *H04N 5/2257* (2013.01)

(56) References Cited

U.S. PATENT DOCUMENTS

| | | | |
|---|---|---|---|
| 2002/0171633 A1* | 11/2002 | Brinjes | G06V 30/228 345/168 |
| 2004/0207542 A1 | 10/2004 | Chang et al. | |
| 2008/0055248 A1 | 3/2008 | Tremblay et al. | |
| 2010/0134327 A1 | 6/2010 | Dinh et al. | |
| 2010/0245237 A1* | 9/2010 | Nakamura | G06F 3/016 340/407.1 |
| 2014/0049417 A1 | 2/2014 | Abdurrahman et al. | |
| 2014/0055352 A1 | 2/2014 | Davis et al. | |
| 2015/0035743 A1 | 2/2015 | Rosener | |
| 2015/0309582 A1 | 10/2015 | Gupta | |
| 2016/0006850 A1 | 1/2016 | Ohki et al. | |
| 2016/0054797 A1 | 2/2016 | Tokubo et al. | |
| 2016/0132642 A1 | 5/2016 | Carmi | |
| 2016/0171846 A1* | 6/2016 | Brav | G08B 6/00 340/407.1 |
| 2016/0274662 A1 | 9/2016 | Rimon et al. | |
| 2017/0011210 A1* | 1/2017 | Cheong | A61B 5/681 |
| 2017/0168565 A1 | 6/2017 | Cohen et al. | |
| 2017/0235369 A1 | 8/2017 | Acer et al. | |
| 2018/0335843 A1* | 11/2018 | Erivantcev | A63F 13/211 |

\* cited by examiner

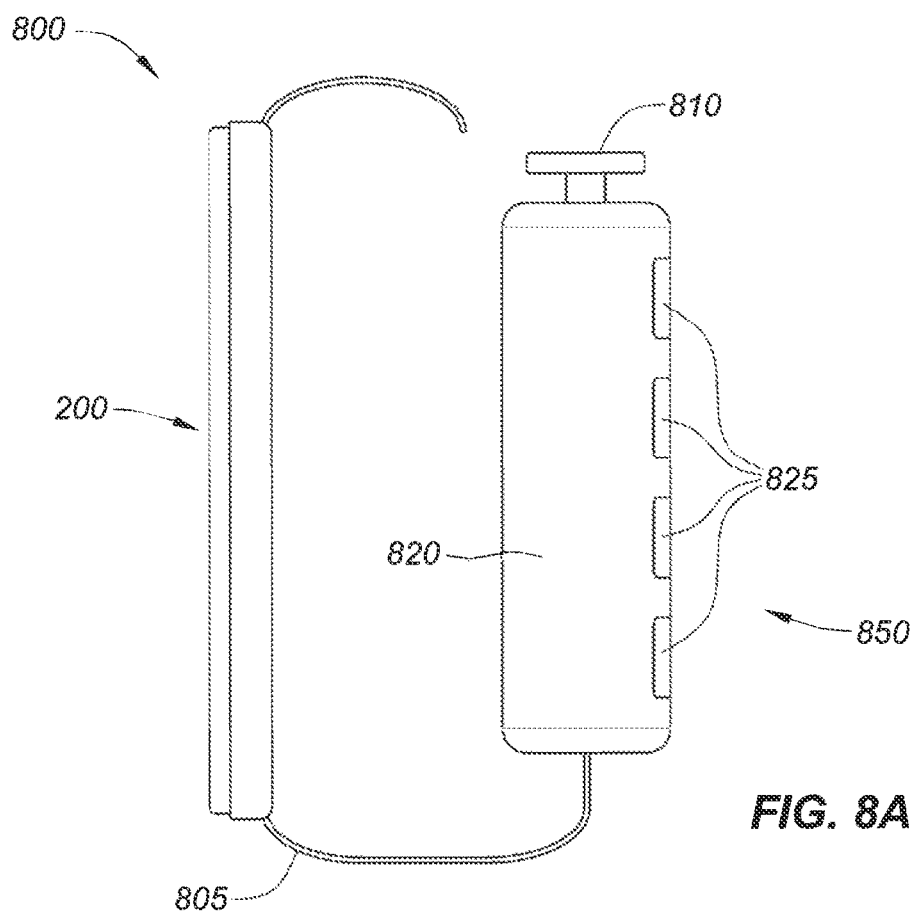
FIG. 8A
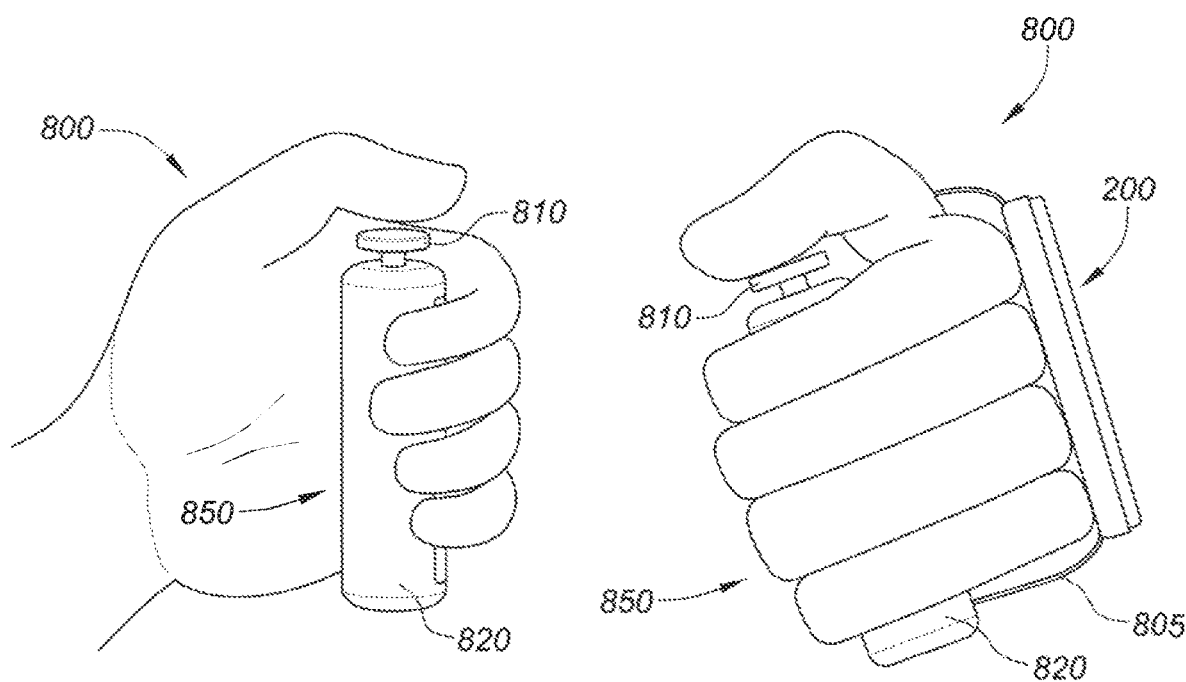
FIG. 8B  FIG. 8C

WEARABLE COMPUTING APPARATUS FOR AUGMENTED REALITY, VIRTUAL REALITY AND ARTIFICIAL INTELLIGENCE INTERACTIONS, AND METHODS RELATING THERETO

CROSS-REFERENCE TO RELATED APPLICATIONS

This application is a continuation of U.S. patent application Ser. No. 16/909,280, filed Jun. 23, 2020, which is a continuation of International Patent Appl. No. PCT/US18/67263, filed Dec. 21, 2018, which claims priority to, and the benefit of, U.S. Provisional Patent Appl. No. 62/610,843 filed Dec. 27, 2017, both of which are incorporated by reference herein in their entireties and for all purposes.

FIELD

The subject matter described herein relates generally to a wearable computing apparatus for augmented reality, virtual reality, and artificial intelligence interactions, and systems and methods relating thereto. Generally, a wearable computing apparatus is provided, wherein the apparatus can be worn on a user's hand and comprises a first subassembly including one or more processors, non-transitory memory for storing instructions, at least one haptic motor, and a first set of sensors adapted to sense positional characteristics of the user's hand. In some embodiments, a second subassembly configured to couple with the first subassembly is provided. The second subassembly can include a plurality of flexible leads adapted to attach to the user's fingers, and wherein each flexible lead includes a haptic motor and a second set of sensors adapted to sense a plurality of positional characteristics associated with each of the user's fingers.

BACKGROUND

Advances in computing technology, such as faster and more powerful processors, component miniaturization, cloud computing and advanced sensor technology have paved the way for virtual reality, augmented reality and artificial intelligence. Virtual and augmented reality (respectively, "VR" and "AR") technologies provide unique ways by which users can visualize and experience information. These technologies typically involve a user wearing a head-mounted display ("HMD") with a display portion positioned directly in front of the user's eyes. Visual data is then transmitted to the HMD for display to the user. HMDs can utilize stereoscopic displays and special lenses to give the illusion that the user is physically inside a VR environment, or in the case of AR, that a virtual object appears in the real world. Artificial intelligence ("AI") describes technology in which a computer is able to perform tasks normally requiring human intelligence, such as speech and/or object recognition. In this regard, VR AR and AI technologies provide for a variety of unique and immersive experiences, and have found applications in a diverse range of industries including video games, the cinematic arts, medicine, military training, real estate, manufacturing, education, and journalism, to name a few.

Despite many applications, the ability for users to interact with objects in a VR or AR environment, or with a computer using AI technology, remains limited. In some VR and AR environments, for example, users can see virtual objects, but the ability to touch, feel or otherwise interact with the virtual objects is limited or, in many cases, not possible at all. Likewise, the ability for users to utilize AI for interactions with objects in either the real world, or VR/AR, is limited. For example, in systems that allow for interactions through a handheld controller, sensory feedback and positional tracking can often be constrained by the limited processing power and/or bandwidth of the computer to which a user's HMD is tethered. This problem is further exacerbated in systems that utilize mobile computing devices, which can have even fewer computing resources.

Thus, there is a need for improved and more efficient systems, devices and methods for AR, VR, and AI intelligence interactions.

SUMMARY

Provided herein are example embodiments of a wearable computing apparatus for augmented reality ("AR"), virtual reality ("VR"), and artificial intelligence ("AI") interactions, as well as systems and methods relating thereto. Generally, a wearable computing apparatus is provided, wherein the wearable computing apparatus can be worn on a user's hand, and comprises a first subassembly (also referred to as a controller subassembly) which includes, at least, one or more processors, non-transitory memory for storing instructions, at least one haptic motor, and a first set of sensors adapted to sense positional characteristics of the user's hand. In many embodiments, the wearable computing apparatus further comprises a second subassembly (also referred to as an accessory subassembly), which is configured to couple with the first subassembly. The second subassembly can include, at least, a plurality of flexible leads, each of which is configured to attach to a finger of the user's hand, a haptic motor and a second set of sensors adapted to sense a plurality of positional characteristics of the user's fingers.

These embodiments and others described herein reflect improvements in the computer-related fields of AR, VR, and AI over prior and existing methods and systems. The various configurations of these systems, devices, methods, features, and advantages are described by way of the embodiments which are only examples. Other systems, devices, methods, features and advantages of the subject matter described herein will be apparent to one with skill in the art upon examination of the following figures and detailed description. It is intended that all such additional systems, devices, methods, features, and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIGS. 8A, 8B and 8C depict, respectively, a side view, a back view, and a front view of a wearable computing apparatus for interacting with a VR environment.

DETAILED DESCRIPTION

Figure 1:
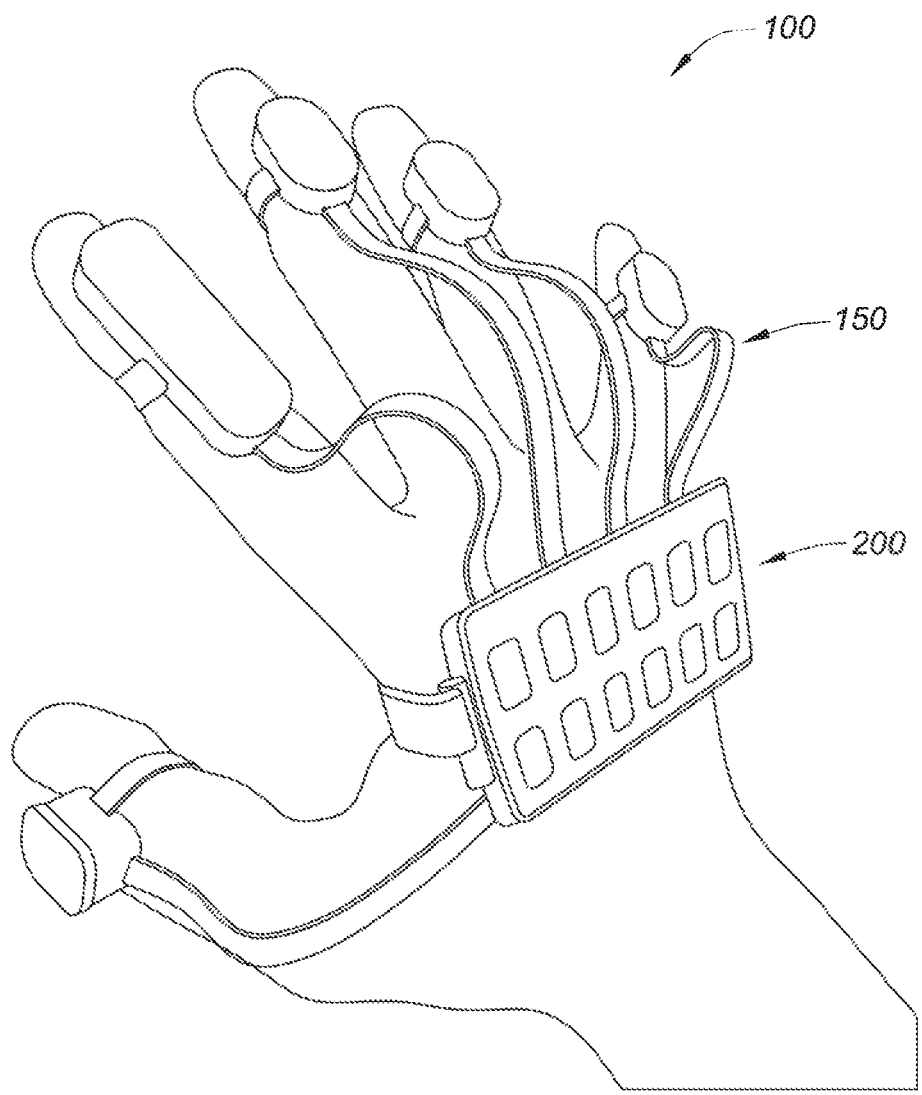
FIG. 1 is a photograph showing a perspective view of an example embodiment of a wearable computing apparatus for AR, VR, and AI interactions.

Before the present subject matter is described in detail, it is to be understood that this disclosure is not limited to the particular embodiments described herein, as such may, of course, vary. It is also to be understood that the terminology used herein is for the purpose of describing particular embodiments only, and is not intended to be limiting, since the scope of the present disclosure will be limited only by the appended claims.

As used herein and in the appended claims, the singular forms "a," "an," and "the" include plural referents unless the context clearly dictates otherwise.

Generally, embodiments of the present disclosure comprise wearable computing apparatuses for augmented reality ("AR"), virtual reality ("VR"), and artificial intelligence ("AI") interactions, and systems and methods relating thereto. Accordingly, the embodiments of the present disclosure may include a first subassembly (also referred to as the controller subassembly), comprising, at least, one or more processors, non-transitory memory for storing instructions, at least one haptic motor, and a first set of sensors adapted to sense positional characteristics associated with the user's hand, and a second subassembly (also referred to as an accessory subassembly), configured to communicatively and physically couple with the first subassembly, wherein the second subassembly comprises, at least, a plurality of flexible leads, each of which is configured to attach to a finger of the user's hand, a haptic motor, and a second set of sensors adapted to sense a plurality of positional characteristics of the user's fingers. In most embodiments the first and second set of sensors include accelerometers and gyroscope sensors.

According to some embodiments, the second subassembly can comprise five flexible leads to be attached to all five of the user's fingers (including the thumb). In some embodiments, however, a flexible lead is not included for the thumb. In yet other embodiments, the second subassembly includes no flexible leads to be attached to the fingers.

Additionally, the present disclosure may also include methods steps that make up one or more routines and/or subroutines for facilitating AR, VR and AI interactions. For example, some embodiments disclosed herein include instructions stored in non-transitory memory of the first subassembly that, when executed by the one or more processors, cause the one or more processors to perform gesture recognition subroutines, voice control subroutines, object recognition subroutines, or some combination thereof. For each and every embodiment of a method, routine or subroutine disclosed herein, systems and devices capable of performing each of those embodiments are covered within the scope of the present disclosure. For example, embodiments of wearable computing apparatuses comprising various subassemblies are disclosed, and these devices and systems may each have one or more sensors, analog-to-digital converters, one or more processors, non-transitory memory for storing instructions, displays, storage devices, communications modules (for wired and/or wireless communications), and/or power sources, that may perform any and all method steps, or facilitate the execution of any and all method steps.

Furthermore, the embodiments of wearable computing apparatuses disclosed herein may include wireless communications modules for communicating with remote computing devices, or with a remote server system that is location-independent, i.e., cloud-based. In addition, embodiments of methods for communications between two or more wearable computing apparatuses are also described.

The embodiments of the present disclosure provide for improvements over prior modes in the computer-related field of AR, VR, and AI. These improvements may include, for example, the optimization of computer resources (such as processors, memory, and network bandwidth) and improved positional tracking by the use of sensors (such as accelerometers and gyroscopes) on the hand and fingers. These improvements are necessarily rooted in computer-based technologies of augmented reality, virtual reality, and artificial intelligence, and are directed to solving a technological challenge that might otherwise not exist but for the need for computer-based AR, VR and AI interactions. Additionally, many of the embodiments disclosed herein reflect an inventive concept in the particular arrangement and combination of the devices, components and method steps utilized for interacting using AR, VR and AI technologies. Other features and advantages of the disclosed embodiments are further discussed below.

Example Embodiments of Wearable Computing Apparatuses for AR, VR and AI Interactions Example embodiments of wearable computing apparatuses for AR, VR, and AI interactions will now be described, as well as their operation.

FIG. 1 is a photograph depicting a perspective view of one example embodiment of a wearable computing apparatus 100 for AR, VR, and AI interactions. As shown in FIG. 1, wearable computing apparatus 100 can be worn on a user's hand and can comprise a first subassembly 200 (also referred to as the controller subassembly) and a second subassembly 150 (also referred to as an accessory subassembly), each of which are described in further detail below. First subassembly 200 can include a top surface having a display disposed thereon. In many of the embodiments, the display can be a touchscreen panel. According to another aspect of the example embodiment, second subassembly 150 can comprise multiple flexible leads, wherein each flexible lead includes a distal portion adapted to be secured to a different finger of the user's hand.

Figure 2A:
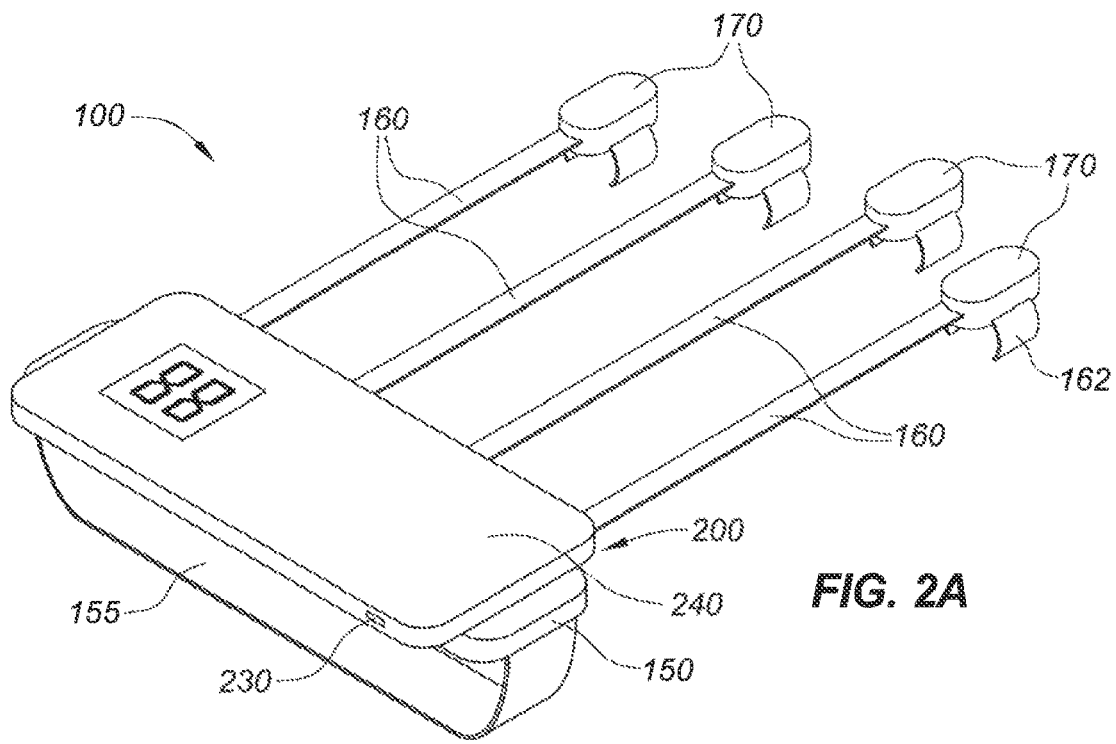
FIGS. 2A and 2B are drawings depicting perspective views of another example embodiment of a wearable computing apparatus for AR, VR, and AI interactions.
Figure 2B:
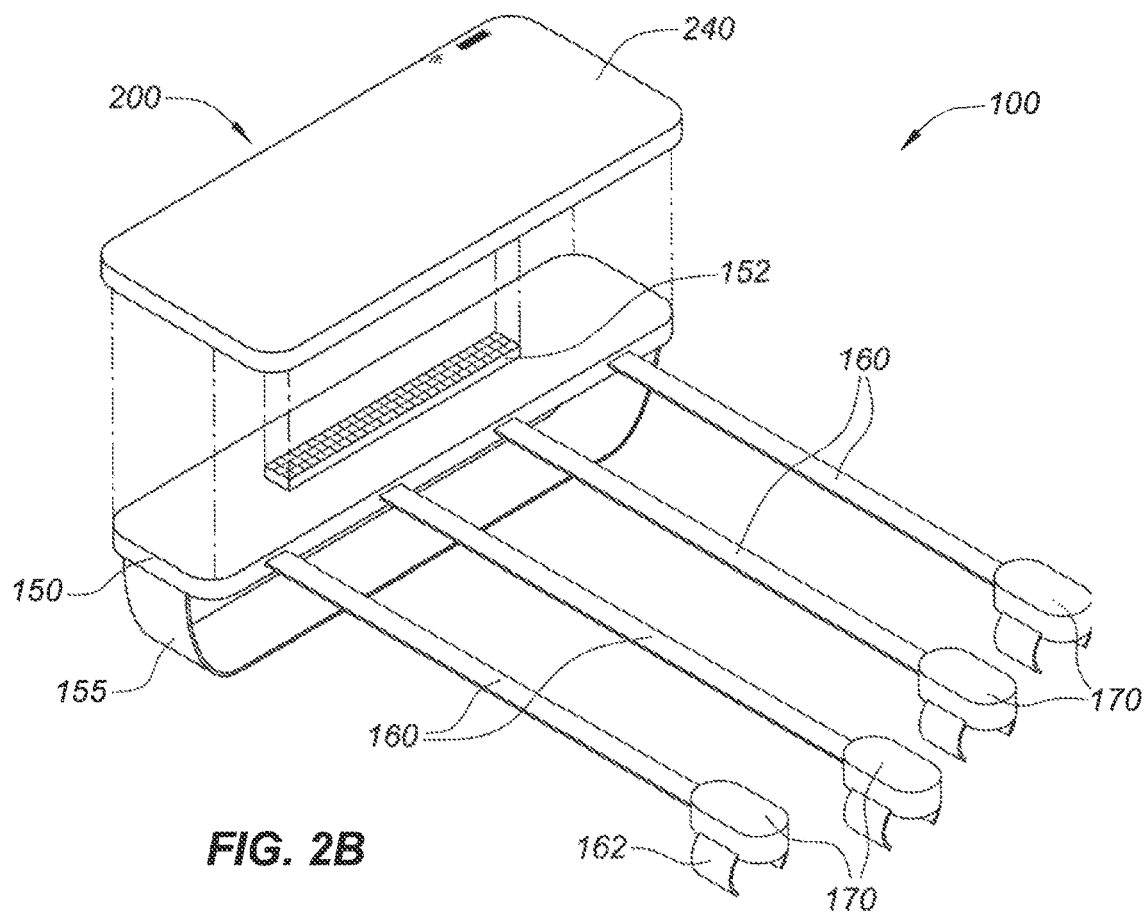

FIGS. 2A and 2B are drawings depicting perspective views of another example embodiment of a wearable computing apparatus 100 for AR, VR, and AI interactions. According to one aspect of the example embodiment, wearable computing apparatus 100 can comprise a first subassembly 200, wherein first subassembly 200 comprises a housing having a top surface, a bottom surface and at least one side surface. In many of the embodiments disclosed herein, a display 240, such as a touchscreen panel, can be disposed on the top surface of first subassembly 200. As can also be seen in FIG. 2A, a micro USB port 230 can be provided on a side surface of first subassembly 200, and configured to allow for charging a rechargeable battery disposed within the housing of first subassembly 200, or for transferring data to or from memory disposed within the housing of first subassembly 200. Although a micro USB port 230 is depicted and described with respect to FIG. 2A, those of skill in the art will also recognize that other physical ports for wired communication and/or charging the rechargeable battery, including but not limited to USB-A, USB-B, USB-C, mini-USB, USB 3, firewire, and/or serial ports, are fully within the scope of the present disclosure.

According to another aspect of the embodiments, wearable computing apparatus 100 can comprise a second subassembly 150, wherein the second subassembly 150 includes an adjustable strap 155 adapted to secure second subassembly 150 to the user's hand. Adjustable strap 155 can be constructed from a material having elastic properties, such as nylon or polyester, in order to attach second subassembly 150 to the user's hand in a secure manner. As shown in FIGS. 2A and 2B, a plurality of flexible leads 160 are also provided, wherein each of the plurality of flexible leads 160 is configured to be removably secured to a finger of the user's hand by a clip 162 or elastic band. In many of the embodiments, each of the flexible leads 160 can include a distal portion 170 which can house a haptic motor (not shown) configured to provide vibratory feedback to each finger, and a set of sensors (not shown) adapted to sense a plurality of positional characteristics associated with the finger to which the flexible lead 160 is secured. In some embodiments, the haptic motors of second subassembly 150 can comprise one or more actuators including, for example, eccentric rotating mass actuators (ERMs), linear resonant actuators (LRAs), and/or high-definition piezoelectric or ceramic haptic actuators. In some embodiments, the sensors can be microelectromechanical (MEMS) devices and can comprise, for example, at least one of an accelerometer for measuring acceleration, including but not limited to single- or three-axis accelerometers, and a gyroscope sensor for measuring rotation and rotational velocity. In other embodiments, the sensors can also include magnetometers for measuring the Earth's magnetic field and a local magnetic field in order to determine the location and vector of a magnetic force, temperature and/or pressure sensors for measuring environmental conditions.

Referring still to FIGS. 2A and 2B, first subassembly 200 can also include a first connector interface (not shown) on a bottom surface configured to communicatively couple the first subassembly 200 to a second connector interface 152 of the second subassembly 150. As best seen in FIG. 2B, first subassembly 200 can thus be coupled with and/or removed from second subassembly 150. According to one aspect of the embodiment, the haptic motor and sensors in distal portions 170 are configured to communicate, send and receive electrical signals with first subassembly 200 through flexible leads 160 via the first and second connector interfaces. Although second connector interface 152 of second subassembly 152 is shown as a female connector, those of skill in the art will recognize that second connector interface 152 can be a male connector or any other type of physical connector configured to mate with the first connector interface of first subassembly 200.

Figure 3A:
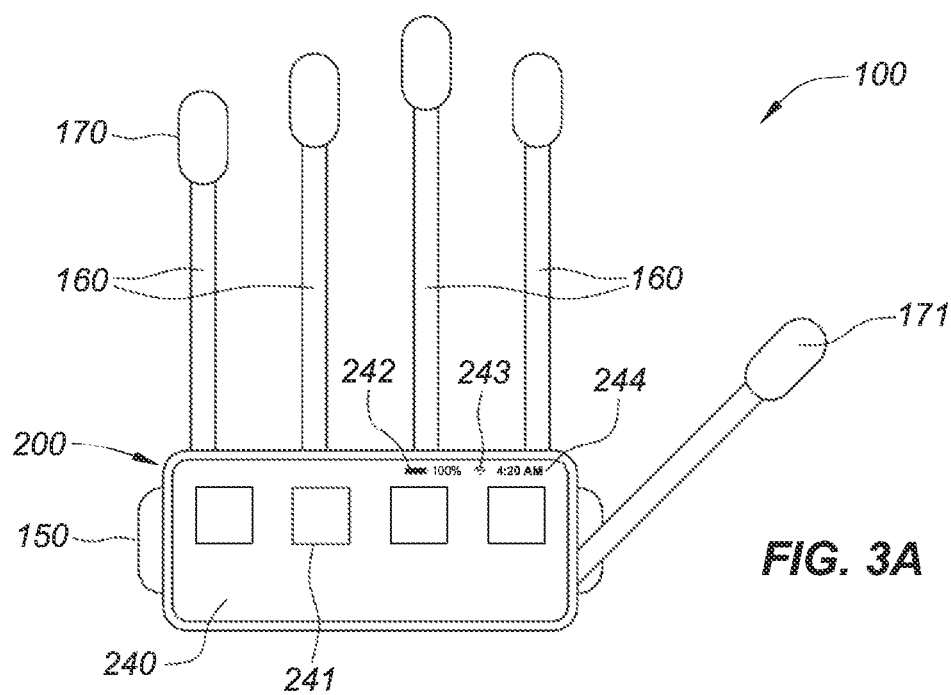
FIG. 3A is a drawing depicting a top view of another example embodiment of a wearable computing apparatus for AR, VR, and AI interactions.

FIG. 3A is a top view of another example embodiment of a wearable computing apparatus 100 for AR, VR, and AI interactions. According to one aspect of the embodiment, a display 240 is disposed on the top surface of first subassembly 200. Display 240 can be a touchscreen panel for visually displaying, for example, graphical icons for various software applications 241 which are stored in memory of first subassembly 200, a battery indicator 242, a wireless connection strength indicator 243, and a date/time display 244. Second subassembly 150, a portion of which is beneath first subassembly 200, as depicted in FIG. 3A, can be removably coupled with first subassembly 200. According to another aspect of the embodiment, second subassembly 150 comprises a plurality of flexible leads 160, wherein each of the plurality of flexible leads is configured to be removably secured to a finger of the user's hand, and wherein each flexible lead includes a distal portion 170 that houses a haptic motor and a set of sensors adapted to sense a plurality of positional characteristics associated with the finger to which distal portion 170 is secured. In some embodiments, second subassembly 150 can include a flexible lead 160 having a distal portion 171 secured to the user's thumb, wherein distal portion 171 also includes a switch or depressible button (not shown) to power on/off wearable computing apparatus 100.

As seen in FIG. 3A, in many of the embodiments disclosed herein, second subassembly 150 can include five flexible leads, each of which is secured to one of the five fingers (including the thumb) of the user's hand. In other embodiments, however, second subassembly 150 can include four flexible leads, each of which is secured to one of four fingers (excluding the thumb), as can be seen in FIGS. 2A and 2B. In still other embodiments, second subassembly 150 can have no flexible leads, such as the embodiments described below with respect to FIGS. 7A to 7E, FIGS. 8A to 8C, and FIG. 9. Those of skill in the art will recognize that embodiments of second subassembly 150 can include any other number of flexible leads 160 (e.g., 1, 2, 3 . . . ), and are fully within the scope of the present disclosure.

Figure 3B:
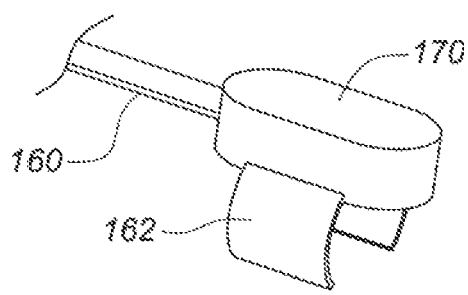
FIG. 3B depicts a perspective view of a portion of an example flexible lead component of a wearable computing apparatus for AR, VR, and AI interactions.

FIG. 3B is a perspective view of an example embodiment of a portion of a flexible lead 160 of a wearable computing apparatus 100 for AR, VR, and AI interactions. In many of the embodiments described herein, each flexible lead 160 is configured to be removably secured to a finger of the user's hand by a clip 162 or elastic band. In some embodiments, clip 162 can include a capacitive sensor having, for example, a mutual-capacitance configuration or a self-capacitance configuration, to detect if and/or when a finger has been attached. According to another aspect of the embodiments, flexible lead 160 can include a distal portion 170 that houses a haptic motor and a set of sensors adapted to sense a plurality of positional characteristics associated with the finger. In some embodiments, one or more distal portions 170, 171 can also include an LED indicator light to indicate when wearable computing apparatus 100 is powered on. The haptic motor and sensors of second subassembly 150, including the capacitive sensor, can be communicatively coupled through the flexible lead 160 to one or more processors disposed in first subassembly 200.

Figure 3C:
FIGS. 3C, 3D and 3E depict side views of an example first subassembly of a wearable computing apparatus for AR, VR, and AI interactions.
Figure 3D:
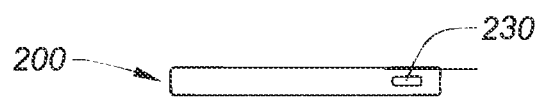
Figure 3E:
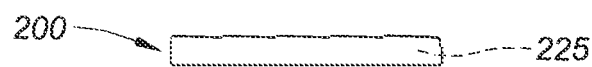

FIGS. 3C, 3D, and 3E are side views of example embodiments of first subassembly 200. Although first subassembly 200 is depicted in the figures as having a rectangular housing, those of skill in the art will recognize that other geometries for the housing of first subassembly 200 are possible and fully within the scope of the present disclosure, including but not limited to, an elliptical, circular, dome-shaped, triangular, square, trapezoidal, hexagonal, or octagonal housing. As can be seen in FIG. 3C, a camera 280 can be disposed on a side surface of first subassembly 200. In some embodiments, camera 280 can be "forward facing," such that the camera lens is disposed on the side surface closest to the fingers. Furthermore, although a single camera 280 is depicted in the figure, those of skill in the art will appreciate that multiple cameras can be disposed on various surfaces of first subassembly 200.

Turning to FIG. 3D, another side view of an example embodiment of first subassembly 200 is provided, and depicts a micro USB port 230 disposed on a side surface of first subassembly 200. In many of the embodiments, micro USB port 230 can be used for charging a battery (not shown) housed in first subassembly 200 and/or transferring data to and from memory (not shown) housed in first subassembly 200. As described earlier, although a micro USB port 230 is depicted and described with respect to FIG. 3D, those of skill in the art will also recognize that other physical ports for wired communication and/or charging the rechargeable battery, including but not limited to USB-A, USB-B, USB-C, mini-USB, USB 3, firewire, and/or serial ports, are fully within the scope of the present disclosure. In other embodiments, a memory device slot can be disposed of on a side surface of first subassembly 200 in addition to (or instead of) micro USB port 230, wherein the memory device slot is configured to receive a removable memory device or media, such as, for example, a Universal Flash Storage device, a micro SD memory card, an SD memory card, an SDHC memory card, an SDXC memory card, a CompactFlash memory card, or a memory stick.

FIG. 3E is another side view of an example embodiment of first subassembly 200. As indicated by the dashed line, according to one aspect of the embodiments, a Near Field Communication ("NFC") antenna or module 225 can be disposed just beneath a side surface of first subassembly 200, wherein the NFC antenna or module 225 is coupled to one or more processors of first subassembly 200, and wherein the NFC antenna or module 225 is configured to send and/or receive communications with a remote computing device, such as with a desktop, laptop or mobile computing device, according to a standard NFC communication protocol (e.g., ECMA-340, ISO/IEC 18092, ISO/IEC 21481, etc.).

Example Embodiment of First Subassembly (Controller Subassembly)

Figure 4:
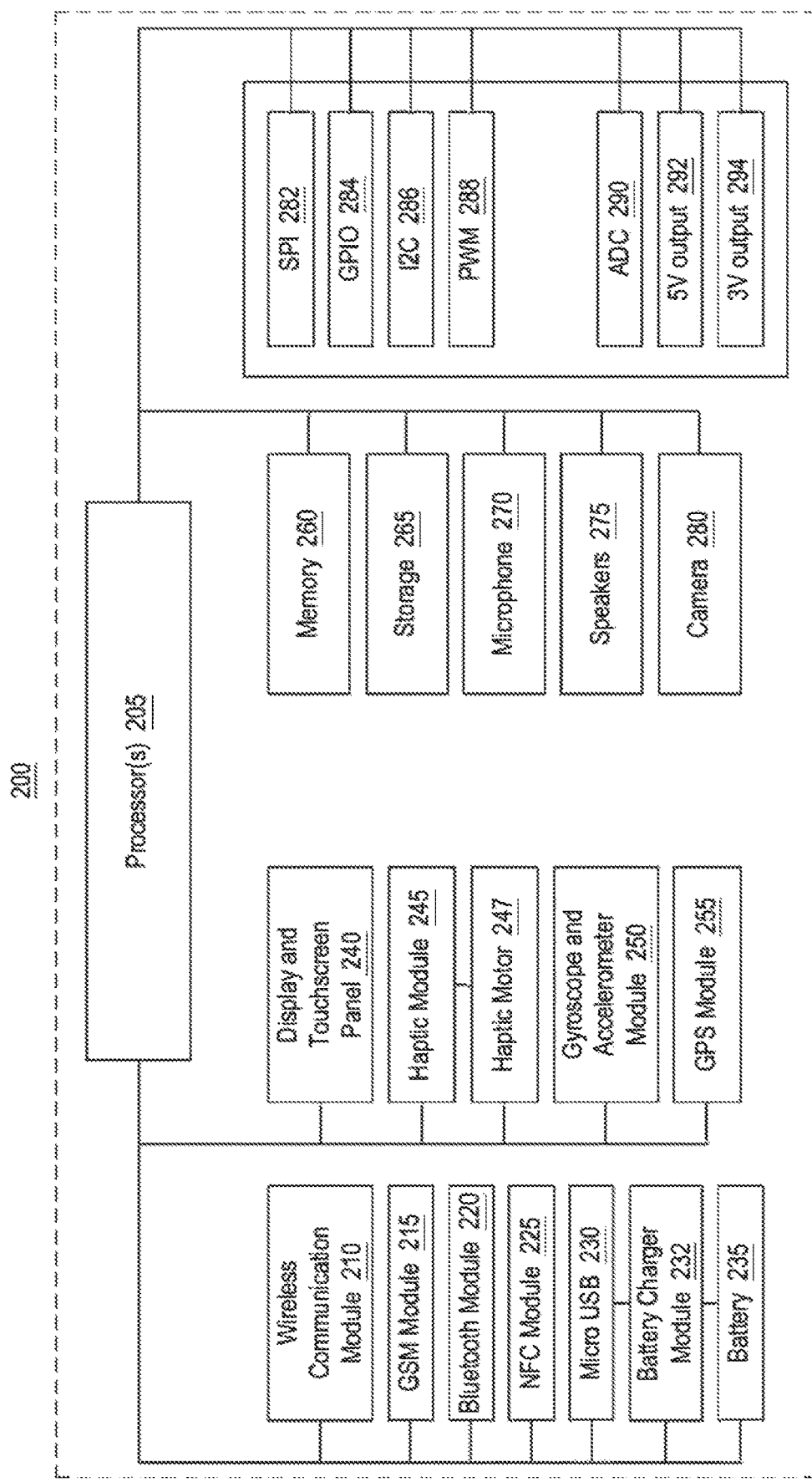
FIG. 4 is a block diagram of an example embodiment of a first subassembly of a wearable computing apparatus for AR, VR, and AI interactions.

FIG. 4 is a block diagram depicting an example embodiment of the first subassembly 200 (also referred to as the controller subassembly) of wearable computing apparatus 100. In some embodiments, first subassembly 200 can be a microcomputer comprising a plurality of sensors, one or more processors, non-transitory memory, and other circuitry mounted on a single printed circuit board and disposed within a housing. According to one aspect of the embodiments disclosed herein, first subassembly 200 is configured to provide dedicated computing resources, such as processing power, battery power, memory, network bandwidth and mass storage, for facilitating user interactions within an AR and/or VR environment, or for performing AI-enabled interactions.

Referring to FIG. 4, first subassembly 200 may include one or more processors 205, which may comprise, for example, one or more of a general-purpose central processing unit ("CPU"), a graphics processing unit ("GPU"), an application-specific integrated circuit ("ASIC"), a field programmable gate array ("FPGA"), an Application-specific Standard Products ("ASSPs"), Systems-on-a-Chip ("SOCs"), Programmable Logic Devices ("PLDs"), or other similar components. Furthermore, processors 205 may include one or more processors, microprocessors, controllers, and/or microcontrollers, or a combination thereof, wherein each component may be a discrete chip or distributed amongst (and a portion of) a number of different chips, and collectively, may have the majority of the processing capability for performing routines to facilitate user interactions with AR and VR environments, for performing AI-enabled interactions, as well as for performing other routines. In many embodiments, first subassembly 200 may also include one or more of the following components, each of which can be coupled to the one or more processors 205: memory 260, which may comprise non-transitory memory, RAM, Flash or other types of memory; mass storage devices 265; a battery charger module 232; a rechargeable battery 235; a display module 240 coupled with a touchscreen panel; a haptic module 245 coupled to one or more haptic motors 247 for providing vibratory/tactile feedback; a gyroscope and accelerometer module 250; a GPS (Global Positioning System) module 255; a microphone 270 for receiving voice input and/or voice commands; one or more speakers 275; and a camera 280. According to some of the embodiments disclosed herein, haptic motors 247 can comprise one or more actuators including, for example, eccentric rotating mass actuators (ERMs), linear resonant actuators (LRAs), and/or high-definition piezoelectric or ceramic haptic actuators. In some embodiments, first subassembly 200 can also include a removable memory device, such as a Universal Flash Storage device, a micro SD memory card, an SD memory card, an SDHC memory card, an SDXC memory card, a CompactFlash memory card, or a memory stick.

In addition, in some embodiments, gyroscope and accelerometer module 250 can include one or more accelerometers for measuring acceleration, including but not limited to single- or three-axis accelerometers; magnetometers for measuring the Earth's magnetic field and a local magnetic field in order to determine the location and vector of a magnetic force; gyroscope sensors for measuring rotation and rotational velocity; or any other type of sensor configured to measure the velocity, acceleration, orientation, and/or position of first subassembly 200. In other embodiments, gyroscope and accelerometer module 250 can also include temperature and pressure sensors for measuring environmental conditions. In many of the embodiments, gyroscope and accelerometer module 250 can comprise microelectromechanical (MEMS) devices.

According to another aspect of the embodiments, first subassembly 200 can further include one or more of the following components, each of which can be coupled to the one or more processors 205, for communicating with a remote computing system (not shown), such as a laptop or desktop computer and/or a mobile computing device, according to a standard wireless networking protocol, such as 802.11x, Bluetooth, Bluetooth Low Energy, or Near Field Communication (NFC): a wireless communications module 210; a GSM (Global System for Mobile communication) module 215; a Bluetooth or Bluetooth Low Energy module 220; an NFC (Near Field Communication) module 225. In some embodiments, first subassembly 200 can include a micro USB module/port 230, which can comprise a port which can be used to charge rechargeable battery 235, transfer data to and from the remote computing system, or attach a peripheral device such as a keyboard or memory device to upload, configure, or upgrade software or firmware on first subassembly 200. Although a micro USB port 230 is depicted and described, those of skill in the art will also recognize that other physical ports for wired communication and/or charging the rechargeable battery, including but not limited to USB-A, USB-B, USB-C, mini-USB, USB 3, firewire, and/or serial ports, are fully within the scope of the present disclosure. Those of skill in the art will further recognize that other standard wired and/or wireless networking protocols are within the scope of the present disclosure.

According to still another aspect of the embodiments, first subassembly 200 can further include one or more of the following components and/or interfaces, each of which can be coupled to the one or more processors 205, for communicating and/or interfacing with a second subassembly 150 (also referred to as an accessory subassembly): an SPI (Serial Peripheral Interface) interface 282; a GPIO (General-purpose input/output) interface 284; an I$^2$C (Inter-integrated Circuit) interface 286; a PWM (Pulse Width Modulation) interface 288; an analog to digital converter module 290 configured to convert an analog signal received from one or more sensors into a digital signal; and 5V and 3V output interfaces 292, 294 to provide power to second subassembly 150.

As understood by one of skill in the art, the aforementioned components and others of the first subassembly are electrically and communicatively coupled in a manner to make a functional device.

Figure 5A:
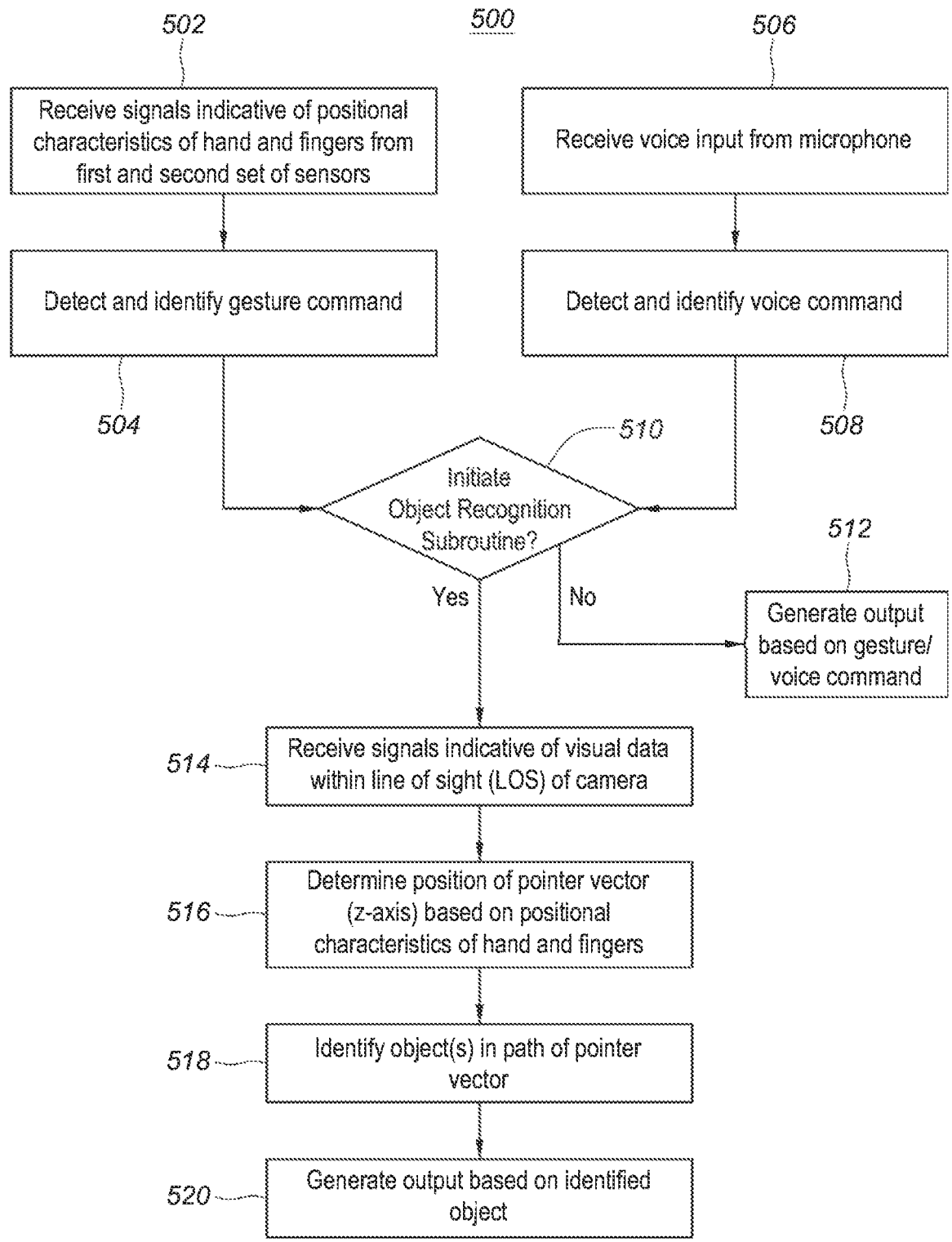
FIG. 5A is a flow diagram of an example embodiment routine for AR, VR and AI interactions using a wearable computing apparatus.

Example Embodiments of Wearable Computing Apparatus and Routines for AI Interactions FIG. 5A is a flow diagram of an example embodiment of a method/routine 500 performed by wearable computing apparatus 100 for AR, VR, and AI interactions. Generally, according to one aspect of the embodiment, wearable computing apparatus 100 can be configured to perform certain routines which can include, for example, object recognition subroutines, voice control subroutines, gesture recognition subroutines, and combinations thereof. Furthermore, those of skill in the art will understand that the routines and subroutines described herein comprise instructions stored in a non-transitory memory of the first subassembly (also referred to as the controller subassembly) which, when executed by one or more processors, cause the one or more processors to perform the method steps of the described routines and subroutines.

Turning to FIG. 5A, method 500 can be initiated at Step 502, wherein wearable computing apparatus 100 receives signals indicative of the positional characteristics of the hand and fingers from the sensors in the first and second subassembly. As described earlier, the first subassembly can include gyroscope sensors and accelerometers to sense positional characteristics of the hand. Similarly, the second subassembly can include gyroscope sensors and accelerometers housed in the distal portion of each flexible lead to sense positional characteristics of each finger. At Step 504, wearable computing apparatus 100 can detect a predefined gesture command based on the positional characteristics of the hand and fingers. In some of the embodiments disclosed herein, for example, the predefined gesture command can be a pointed index finger. In other embodiments, the predefined gesture command can be a pinching motion between the index finger and thumb. Those of skill in the art will recognize that other gestures can be utilized, and are fully within the scope of the present disclosure.

At Step 510, based upon the predefined gesture, wearable computing apparatus 100 determines whether an object recognition subroutine should be initialized. If the predefined gesture does not call for an object recognition subroutine then, at Step 512, wearable computing apparatus 100 generates a predefined output based on the gesture command. For example, wearable computing apparatus 100 can include instructions stored in non-transitory memory for a routine for telling the current time, wherein the routine can include a gesture recognition subroutine, and wherein the predefined gesture command has been defined as drawing a circle in the air with the index finger ("draw circle gesture"). According to one aspect of the embodiment, if the "draw circle gesture" is detected at Step 504, then wearable computing apparatus 100 can visually output the current time on its display or output an audio indication of the current time.

Referring still to FIG. 5A, some embodiments of method 500 can include a voice control subroutine, which can be initiated at Step 506, and wherein wearable computing apparatus 100 receives voice input from the microphone. As described earlier with respect to FIG. 4, first subassembly of wearable computing apparatus 100 can include a microphone. Those of skill in the art will appreciate that a microphone can also be housed in one of the distal portions of the flexible leads of the second subassembly, and used for voice input. At Step 508, wearable computing apparatus 100 can detect a predefined voice command based on the voice input received from the microphone. At Step 510, based upon the predefined voice command, wearable computing apparatus 100 determines whether an object recognition subroutine should be initialized. If the predefined voice command does not call for an object recognition subroutine then, at Step 512, wearable computing apparatus 100 generates a predefined output based on the voice command.

Similar to the previous embodiment, wearable computing apparatus 100 can include instructions stored in non-transitory memory for a routine for telling time, wherein the routine can include a voice command subroutine, and wherein the predefined voice command has been defined as the spoken words: "Ola, what time is it?" According to one aspect of the embodiment if the voice command "Ola, what time is it?" is detected by the microphone, then wearable computing apparatus 100 can visually output the current time on its display or output an audio indication of the current time.

According to some embodiments, method 500 can also include one or more object recognition subroutines. Referring still to FIG. 5A, at Step 514, after the object recognition subroutine has been initiated, wearable computing apparatus 100 receives signals indicative of visual data within the line of sight (LOS) of the camera. In many of the embodiments, the signals can be video signals. In other embodiments, the signals can comprise infrared images. At Step 516, wearable computing apparatus 100 can determine a pointer vector (shown as the z-axis in FIG. 5B), based on a predefined gesture, such as a user pointing the index finger, and the positional characteristics of the user's hands and fingers. At Step 518, wearable computing apparatus 100 can identify one or more objects in the path of the pointer vector. At Step 520, wearable computing apparatus 100 can generate a predetermined output according to the identified object or objects.

Figure 5B:
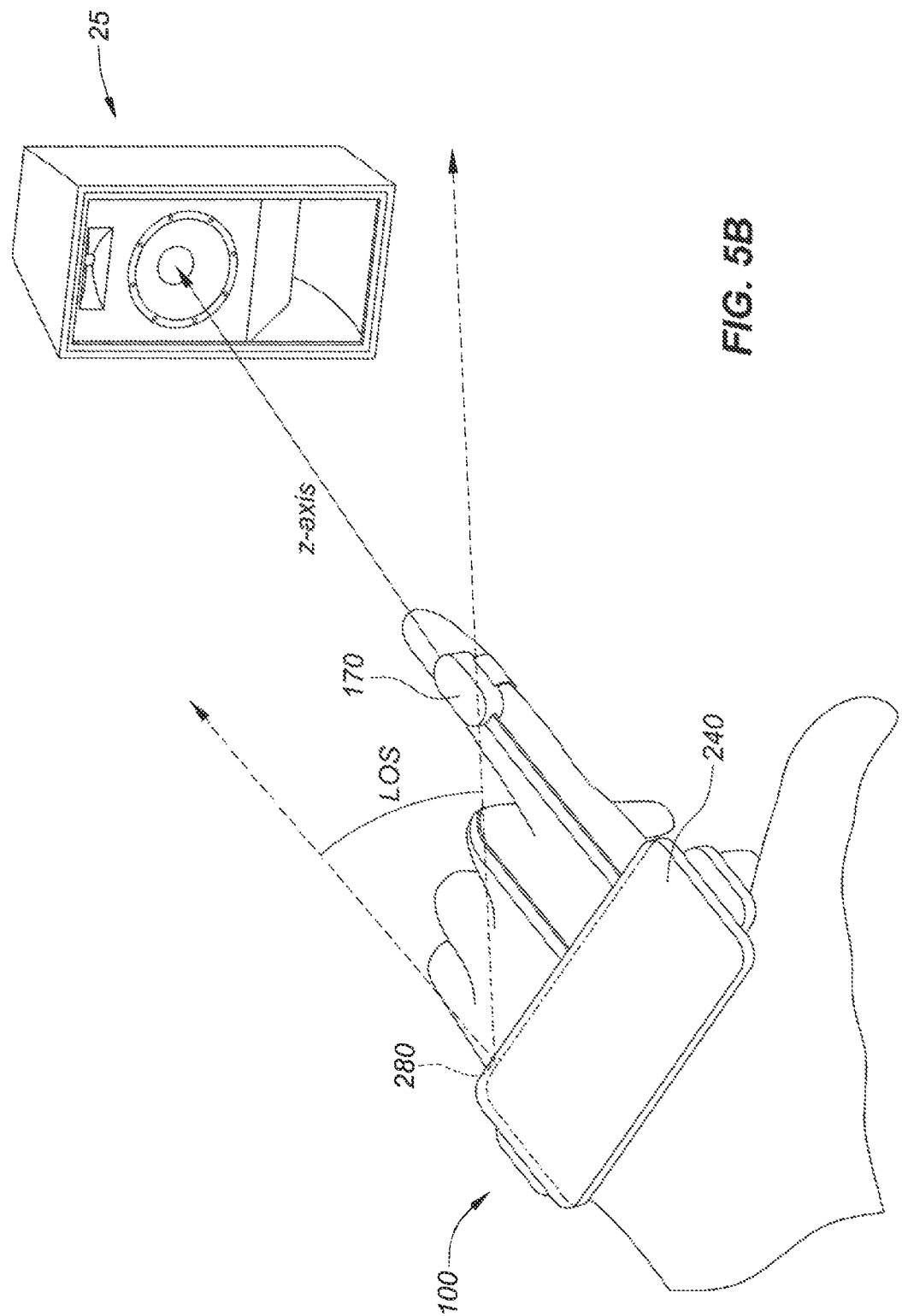
FIGS. 5B, 5C, and 5D depict perspective views of an example embodiment of a wearable computing apparatus for AR, VR, and AI interactions during various uses.

Turning to FIG. 5B, an example routine for playing music on an output device, such as a speaker, is depicted, wherein the routine comprises a combination of, at least, a gesture recognition subroutine and an object recognition subroutine. In particular, a user makes a gesture while wearing wearable computing apparatus 100, wherein the gesture comprises pointing the user's index finger at an object. A gesture subroutine detects a "finger pointing" gesture, and in response thereto, initiates an object recognition subroutine associated with the "finger pointing" gesture. The object recognition subroutine can then cause wearable computing apparatus 100 to receive a plurality of signals indicative of visual data within a line of sight ("LOS") of camera 280, in order to determine a pointer vector (z-axis) based on sensor data received from the sensors disposed in the distal portion 170 of flexible lead attached to the index finger, and to identify the object (in this case, speaker 25) in the path of the pointer vector. In some embodiments, wearable computing apparatus 100 can provide a visual notification on display 240 and/or or tactile feedback via the one or more haptic motors of the first or second subassembly, to confirm that speaker 25 has been successfully identified. In response to identifying speaker 25, wearable computing apparatus 100 can perform one or more of the following output steps: initiate a music app on wearable computing apparatus 100, display a graphical user interface (GUI) for a music app on display 240, establish a wireless communications channel with speaker 25, such as a Bluetooth connection; and/or output audio to speaker 25. Those of skill in the art will further appreciate that any combination of the aforementioned steps is fully within the scope of the present disclosure.

Figure 5C:
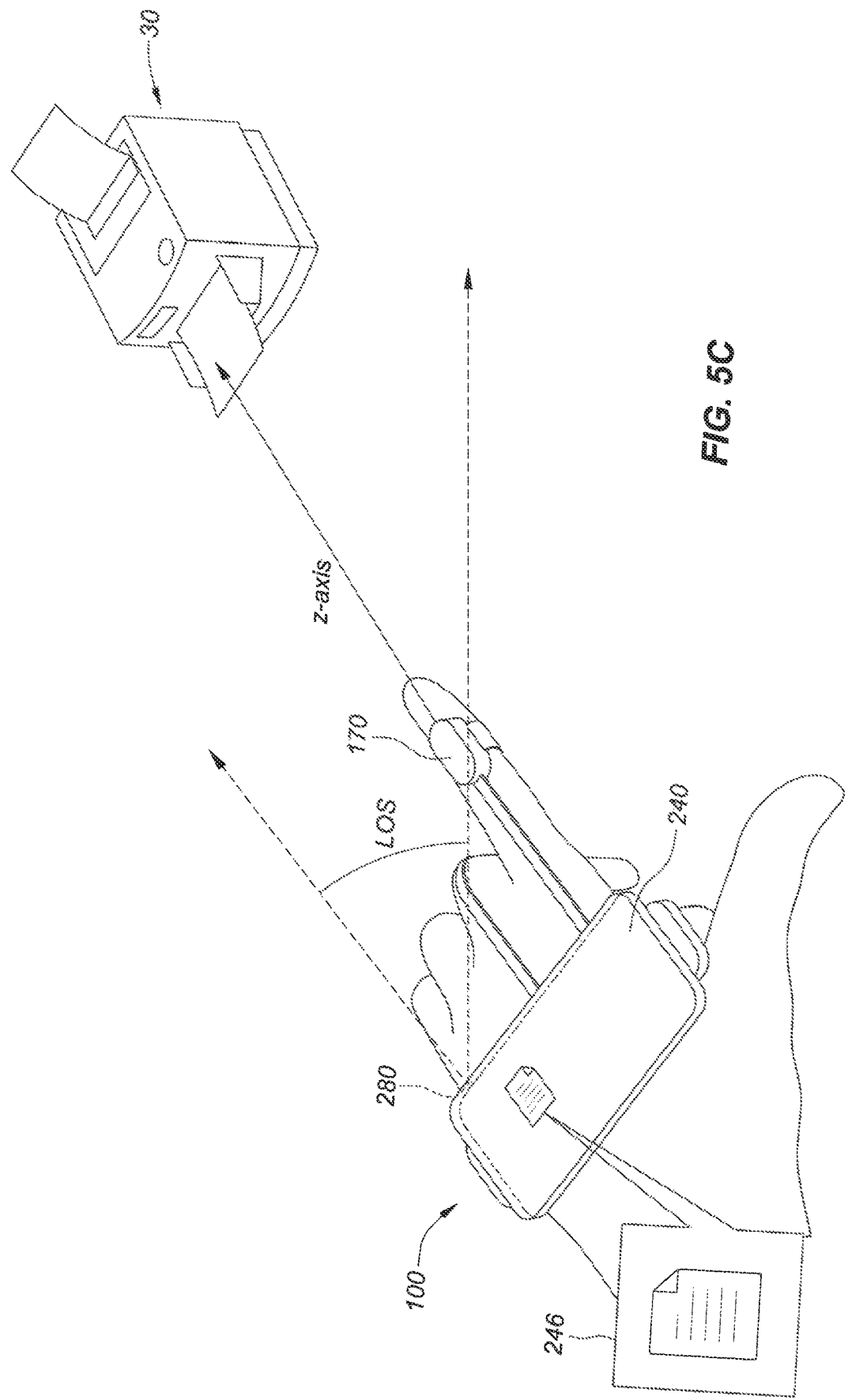

Turning to FIG. 5C, an example routine for printing a document is depicted, wherein the routine can comprise a combination of one or more gesture recognition subroutines, a voice control subroutine and/or an object recognition subroutine. According to one aspect of the disclosed embodiments, the routine can be initiated when a user selects a document icon 246 on the touchscreen panel 240 of wearable computing apparatus 100. In some embodiments, the routine can be initiated when a user issues a voice command (such as "Ola, print selected document"). In other embodiments, the user can perform a first predefined gesture, such as, for example, grabbing a "virtual" document icon displayed in augmented reality on the touchscreen panel 240. A gesture subroutine detects the "grabbing" gesture, and in response thereto, selects the appropriate document. Subsequently, the user can perform a second predefined gesture, wherein the second predefined gesture comprises pointing the user's index finger at an object. The gesture subroutine detects a "finger pointing" gesture, and in response thereto, initiates an object recognition subroutine associated with the "finger pointing" gesture. In other embodiments, the predefined gesture may comprise "dragging" the selected document to an object in real life. The object recognition subroutine can then cause wearable computing apparatus 100 to receive a plurality of signals indicative of visual data within a line of sight ("LOS") of camera 280, in order to determine a pointer vector (z-axis) based on sensor data received from the sensors disposed in the distal portion 170 of flexible lead attached to the index finger, and to identify the object (in this case, printer 30) in the path of the pointer vector. In some embodiments, wearable computing apparatus 100 can provide a visual notification on display 240 and/or or tactile feedback via the one or more haptic motors of the first or second subassembly, to confirm that printer 30 has been successfully identified. In response to identifying printer 30, wearable computing apparatus 100 can cause the selected document to print to printer 30. In some embodiments, a graphical user interface (GUI) for printing can also be shown on display 240. Those of skill in the art will further appreciate that any combination of the aforementioned steps is fully within the scope of the present disclosure.

Referring to FIGS. 5B and 5C, "target" objects, such as a speaker system or a printer device, are depicted and described in operation with the example routines and subroutines of method 500. However, those of skill in the art will appreciate that other objects can also be incorporated for use with these example routines and subroutines of method 500. For example, in some embodiments, the steps of the example routines and subroutines of method 500, as described with respect to FIG. 5A, can be performed with respect to a visual display (e.g., television or computer screen) to cause the visual display to output desired visual and audio content. In other embodiments, the steps of the example routines and subroutines of method 500, as described with respect to FIG. 5A, can be performed with respect to an unmanned aerial vehicle (i.e., UAV or drone) to cause the UAV to move in a desired direction. In still other embodiments, the steps of the example routines and subroutines of method 500 can be performed with respect to one or more robotic arms, to cause the one or more robotic arms to move in a desired manner. These examples are meant to be illustrative only, as those of skill in the art will appreciate that other objects and devices to be controlled according to the example routines and subroutines of method 500 are within the scope of this disclosure, and are not limited in any way to the examples described herein.

Figure 5D:
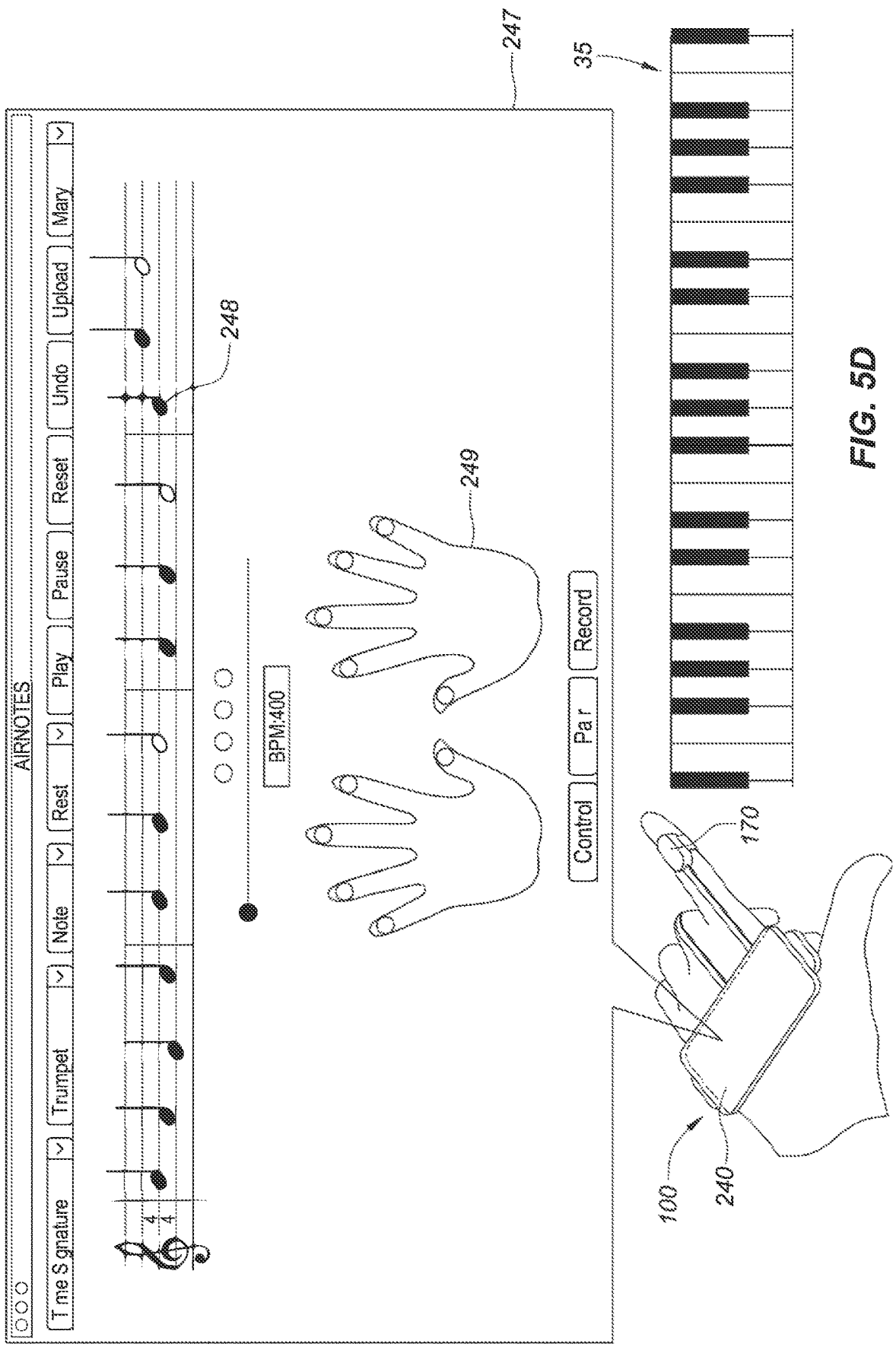

Turning to FIG. 5D, an example routine for instructing a user on how to play a musical instrument is depicted, wherein the routine can comprise a combination of one or more gesture recognition subroutines. According to one aspect of the disclosed embodiments, the routine can be initiated when a user launches a musical instrument interface 247 from the touchscreen panel 240 of wearable computing apparatus 100. Subsequently, a sequence of musical notes 248 can be visually displayed on interface 247, along with a graphical representation of user's hands and fingers 249. According to one aspect of the embodiments, a haptic motor housed in a distal portion 170 of a flexible lead can provide a vibratory indication to the user to designate the correct finger to play the next note from the sequence of musical notes 248. In some embodiments, a LED indicator light can also simultaneously provide a visual indication to the user to designate the correct finger to play the next note from the sequence of musical notes 248. In other embodiments, a gesture subroutine can track the motion of each finger and provide visual, auditory and/or vibratory feedback in response to an incorrect movement.

Referring still to FIG. 5D, according to another aspect of the disclosed embodiments, an example routine for composing a musical piece is provided, wherein the routine can comprise a combination of one or more gesture recognition subroutines. As with the previous embodiment, the routine can be initiated when a user launches a musical instrument interface 247 from the touchscreen panel 240 of wearable computing apparatus 100. Subsequently, a user can select a "record mode" from interface 247. According to one aspect of the embodiments, wearable computing apparatus 100 can utilize the microphone housed in first subassembly to detect and identify each note being played by user. Furthermore, in some embodiments, a gesture subroutine can detect the finger played, and correlate the finger with each detected audio note. Subsequently, a sequence of musical notes 248 can be constructed and stored in memory of wearable computing apparatus 100. Those of skill in the art will further appreciate that any combination of the aforementioned steps is fully within the scope of the present disclosure.

According to another embodiment (not shown), another example routine for instructing a user on how to play a musical instrument can comprise a first wearable computing apparatus 100A, to be worn by an instructor, and a second wearable computing apparatus 100B, to be worn by a student. (Additional details regarding example embodiments of methods for communications between two or more wearable computing apparatuses are further described below with respect to FIGS. 11A and 11B.) According to one aspect of the embodiment, the instructor can play a first musical instrument while wearing first wearable computing apparatus 100A, which can include one or more sensors that are configured to detect movement of the instructor's hand and fingers, while the instructor is playing the first musical instrument, and generate one or more data signals in response thereto. Subsequently, first computing apparatus 100A, which can also include a wireless communication module, transmits the one or more data signals to the second wearable computing apparatus 100B, worn by the student. According to some embodiments, the transmission of the one or more data signals from first wearable computing apparatus 100A to second wearable computing apparatus 100B can comprise either wired or wireless communications, such as, e.g., according to a wireless communication protocol (e.g., Bluetooth, Wi-Fi, infrared, etc.). According to another aspect of the embodiment, wearable computing apparatus 100B can include a wireless communication module for receiving the transmitted one or more data signals, one or more processors, memory coupled to the one or more processors, and one or more haptic motors. Upon receiving the one or more data signals, the processors of wearable computing apparatus 100B can execute instructions stored in memory that cause the one or more haptic motors to output a vibratory signal.

For example, according to some embodiments, if the instructor plays a note with his index finger of the right hand, on which wearable computing apparatus 100A is worn, the one or more sensors of wearable computing apparatus 100A detect the movement of the index finger of the instructor's right hand, generate one more data signals corresponding to the movement, and transmits, with a wireless communication module of wearable computing apparatus 100A, the one or more data signals to wearable computing apparatus 100B, worn by the student. Subsequently, wearable computing apparatus 100B receives, by a wireless communication module of wearable computing apparatus 100B, the one or more data signals. Subsequently, instructions stored in memory of wearable computing apparatus 100B are executed to cause one or more haptic motors to generate a vibratory output to the index finger of the student's right hand. In some embodiments, wearable computing apparatus 100B can also include instructions stored in memory which, when executed by the one or more processors, cause a visual output to a display of wearable computing apparatus 100B. The visual output can include, for example, a graphical representation of user's hands and fingers, as shown in FIG. 5D. In still other embodiments, an LED indicator light can also simultaneously provide a visual indication to the user to designate the correct finger to play the next note from the sequence of musical notes, as described with respect to FIG. 5D. Those of skill in the art will appreciate that the various visual and vibratory outputs described herein can be utilized either individually or, optionally, simultaneously to maximize the stimulus received by the student.

Furthermore, although a keyboard is depicted in FIG. 5D, those of skill in the art will appreciate that other musical instruments are within the scope of the present disclosure. For example, in some embodiments, the example routines described herein can be performed with a saxophone, guitar, or violin, among others. The specific instruments described herein and with respect to FIG. 5D are meant to be illustrative only, and not meant to be limiting in any way.

Example Embodiment of Wearable Computing Glove-Like Apparatus

Figure 6:
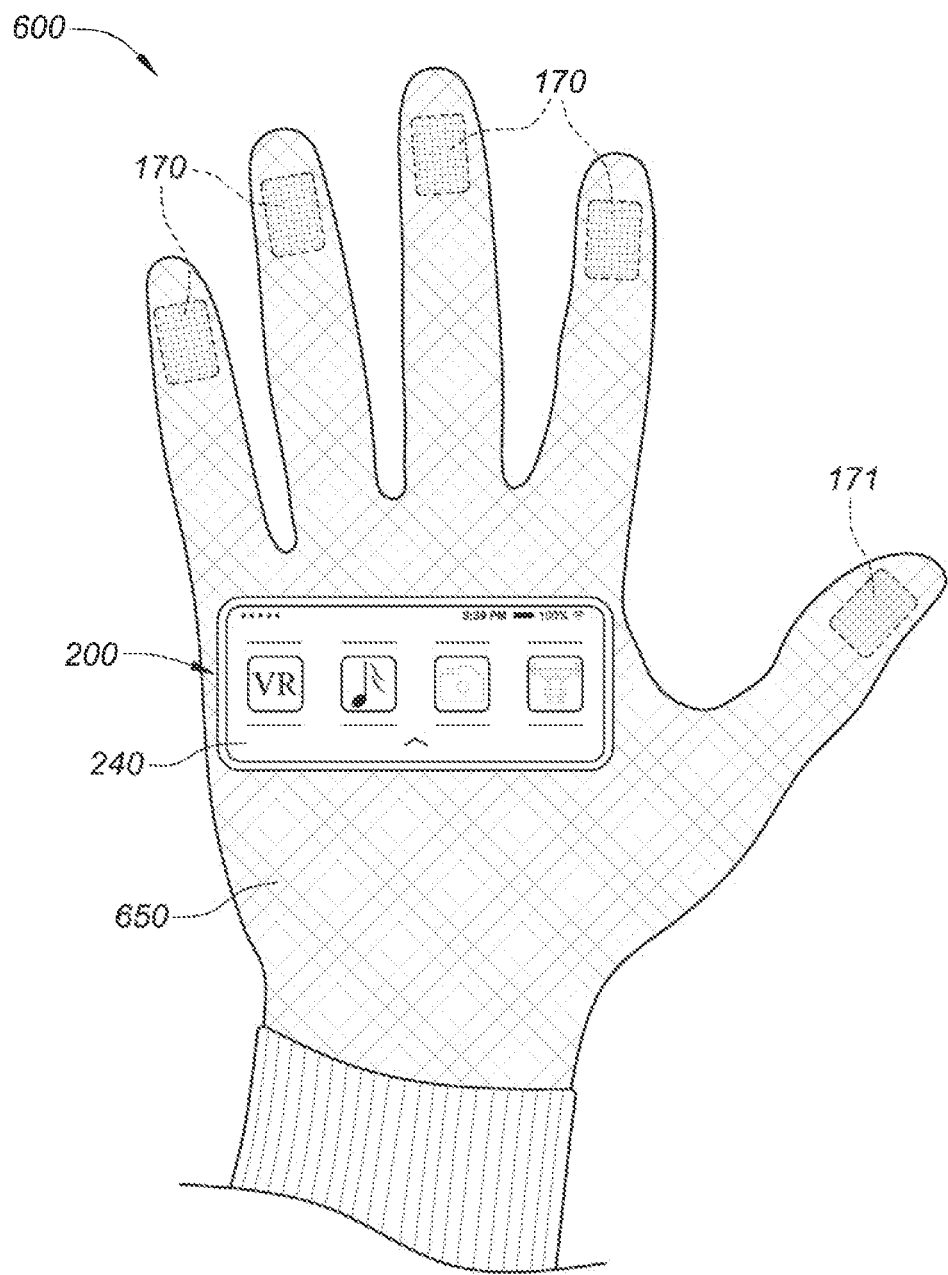
FIG. 6 is a drawing depicting another example embodiment of a wearable computing apparatus for AR, VR, and AI interactions.

FIG. 6 is a top view of an alternative embodiment of a wearable computing apparatus 600 for AR, VR, and AI interactions. In a general sense, wearable computing apparatus 600 shares many similarities with the prior embodiment described with respect to FIG. 3E. For example, according to one aspect of the embodiment, wearable computing apparatus 600 is adapted to be worn on a user's hand and comprises first subassembly 200, which includes touchscreen display 240. According to some embodiments, second subassembly 650 of computing apparatus 600 comprises a glove-like structure (instead of a plurality of "exposed" flexible leads), wherein the glove-like structure is configured to cover the entire hand. In some embodiments, for example, second subassembly 650 can be constructed from a durable clothlike material, such as a durable nylon or rubber material. According to another aspect of the disclosed embodiments, flexible leads can be embedded in the material of the glove-like structure such that they are substantially invisible to the user. In some embodiments, distal portions 170, 171 of flexible leads (indicated by the dashed line) can also be embedded in the material of the glove-like structure at the tips of the user's fingers.

Example Embodiment of Wearable Computing Apparatus for AR Interactions

Figure 7A:
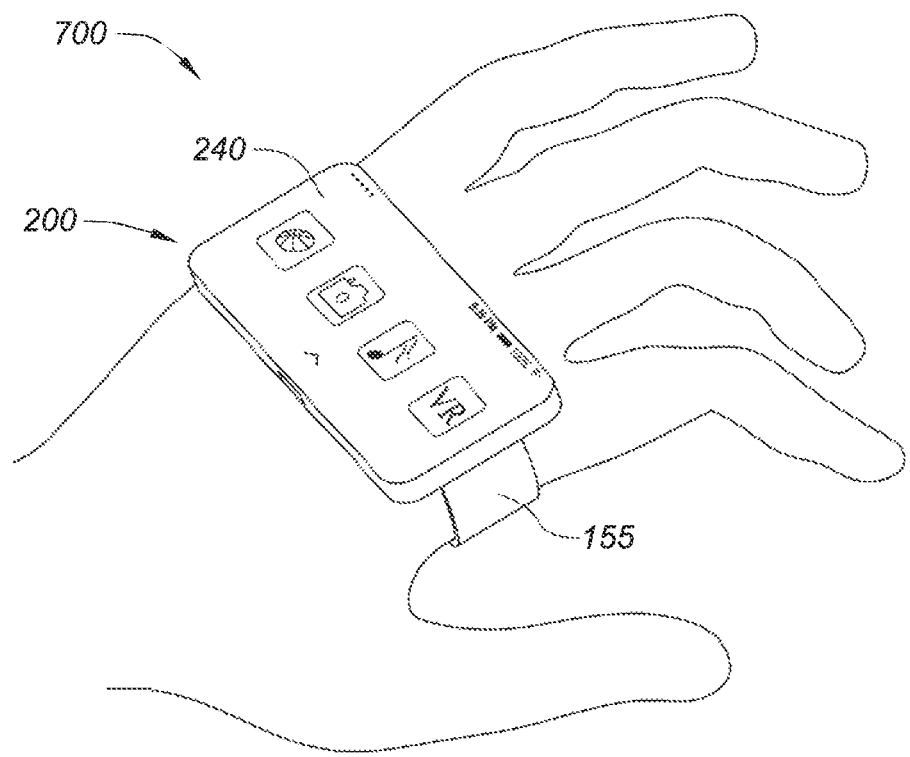
FIGS. 7A, 7B and 7C depict perspective views of another example embodiment of a wearable computing apparatus for AR, VR, and AI interactions.
Figure 7B:
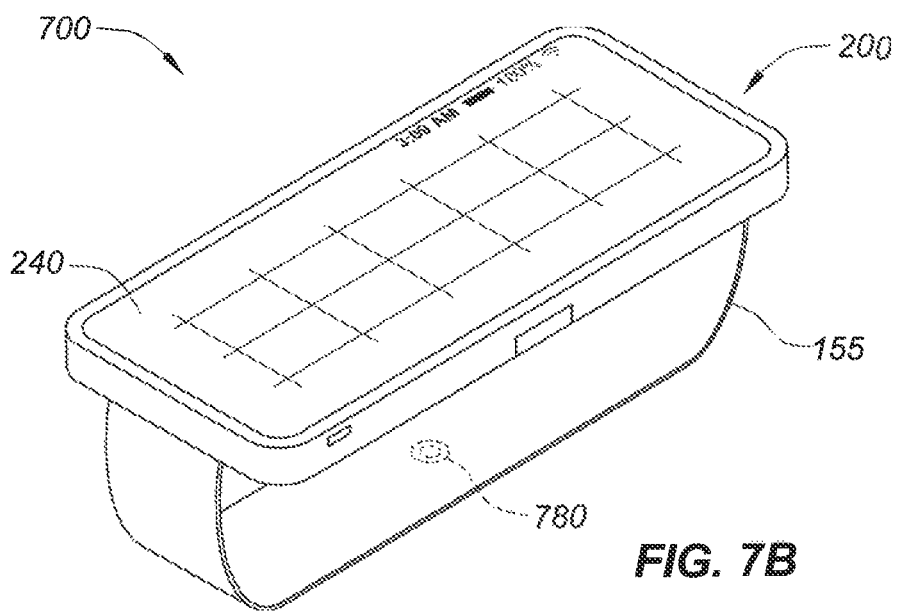
Figure 7C:
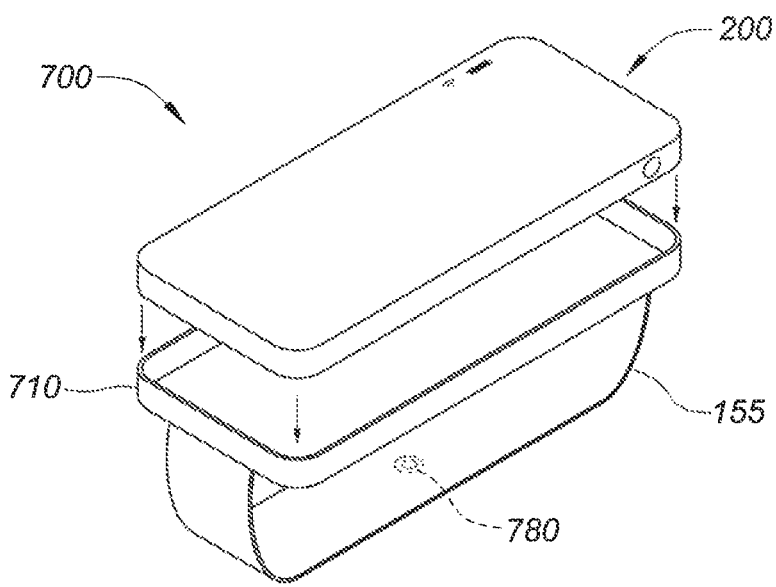
Figure 7D:
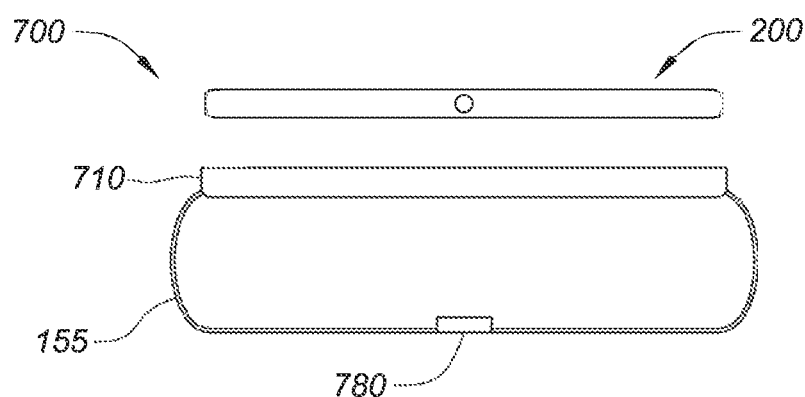
FIG. 7D depicts a side view of an example embodiment of a wearable computing apparatus for AR, VR, and AI interactions.

FIGS. 7A to 7C show perspective views, and FIG. 7D shows a side view of, an alternative embodiment of wearable computing apparatus 700 for AR and AI interactions. According to one aspect of the embodiments disclosed herein, wearable computing apparatus 700 includes a first subassembly 200 that includes a display 240, such as a touchscreen panel. Unlike the previously described embodiments, however, wearable computing apparatus 700 does not include a second subassembly comprising a plurality of flexible leads. Instead, as best seen in FIGS. 7C and 7D, first subassembly 200 is configured to be removably coupled to a face plate 710 disposed on a surface of adjustable strap 155. In addition, in some embodiments, a depth camera 780 can be disposed on a portion of adjustable strap 155 that is opposite to face plate 710 and which is proximate to the user's palm. In some embodiments, depth camera 780 can be configured to sense depth, for example, by projecting infrared light onto an object and using an infrared camera (i.e., with CMOS sensors) to determine depth of an object by analyzing displacement of the projected infrared light. Depth camera 780 can be coupled to first subassembly 200 through a flexible lead embedded in the material of adjustable strap 155. In addition, face plate 710 can include a connector interface (not shown) for communicatively coupling the flexible lead embedded in adjustable strap 155 to first subassembly 200.

Figure 7E:
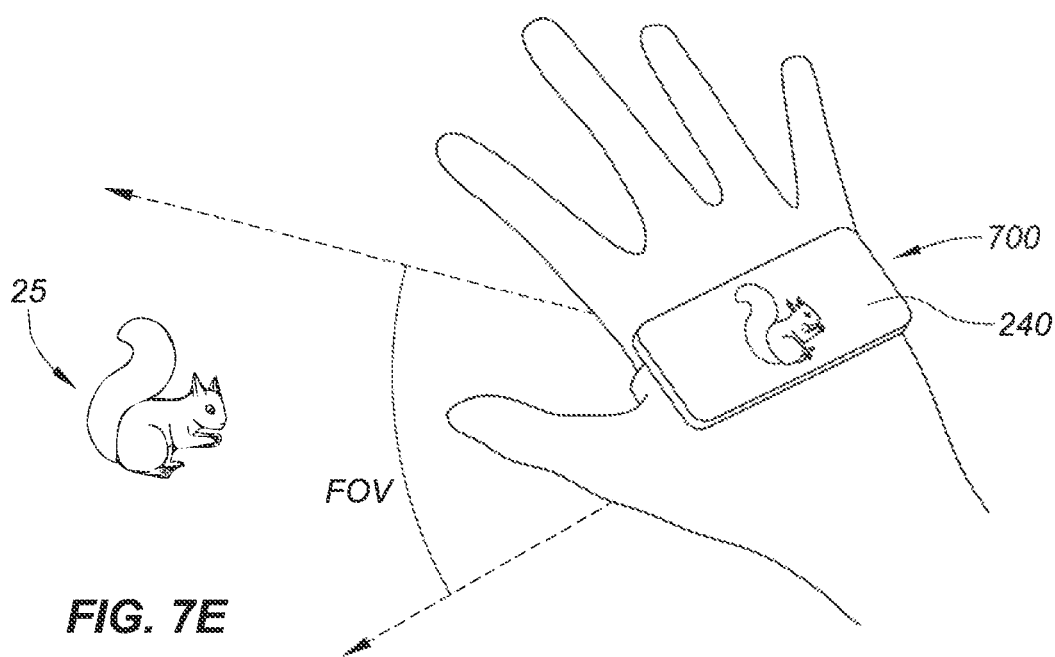
FIG. 7E depicts a perspective view of another example embodiment of a wearable computing apparatus for AR, VR, and AI interactions during use.

Turning to FIG. 7E, a perspective view of an example embodiment of a wearable computing apparatus 700 is provided, wherein wearable computing apparatus 700 is shown during use for interacting with augmented reality. As can be seen in FIG. 7E, wearable computing apparatus 700 comprises a display 240 disposed on the back portion of the user's hand, and a camera disposed on a portion of the adjustable strap proximal to the user's palm (as shown in FIGS. 7C and 7D). According to one aspect of the embodiment, wearable computing apparatus 700 can use camera to capture a field of vision ("FOV") of the user's real-world environment, and display the real-world environment on display 240. In addition, according to another aspect of the embodiment, wearable computing apparatus 700 can generate and visually display a three-dimensional virtual object 25 onto display 240 in such a manner that the 3D virtual object appears to exist in the real-world environment when the user is viewing the screen. In this regard, wearable computing apparatus 700 can be utilized for AR viewing and AR interactions. Furthermore, those of skill in the art will appreciate that any of the aforementioned routines and/or subroutines, including object recognition subroutines, voice control subroutines, gesture recognition subroutines, and combinations thereof (as described with respect to the embodiments of FIGS. 5A and 5B), can be utilized with wearable computing apparatus 700, and are fully in the scope of the present disclosures.

Example Embodiment of Wearable Computing Apparatus for VR Interactions

FIGS. 8A, 8B, and 8C depict, respectively, a side view, a back view, and a front view of a wearable computing apparatus 800 for interacting with a VR environment. As best seen in FIG. 8A, wearable computing apparatus 800, like previous embodiments, includes a first subassembly 200, which can include a touchscreen panel or other display (not shown). According to one aspect of the embodiments, first subassembly 200 of wearable computing apparatus 800 can be removably coupled with a second subassembly 850, which comprises an adjustable strap 805 adapted to secure second subassembly 850 to the user's hand. Adjustable strap 805 can be constructed from a material having elastic properties, such as nylon or polyester, in order to attach second subassembly 850 to the user's hand in a secure manner.

According to one aspect of the disclosed embodiments, second subassembly 850 further comprises a handle 820 configured to be grasped in the user's hand. In many of the disclosed embodiments, a plurality of sensors 825 can be vertically disposed along handle 820, wherein the sensors 825 can be configured to detect the presence of each finger, and/or the distance of each finger from handle 820. According to some embodiments, sensors 825 can comprise capacitive sensors, lasers and/or infrared sensors, or a combination thereof. In some embodiments, handle 820 can also house one or more haptic motors, accelerometers, gyroscope sensors, such as those described with respect to the embodiment in FIGS. 2A and 2B. According to another aspect of the disclose embodiments, second subassembly 850 further comprises an analog joystick 810 disposed in the top portion of handle 820. In many of the embodiments, analog joystick 810 is configured to be manipulated by user's thumb, while user is grasping handle 820, and can be used to navigate the user in a VR environment. In some embodiments, analog joystick 810 can include a sensor, such as a capacitive sensor, laser and/or infrared sensor, to track the presence and/or position of the user's thumb.

Additional Alternative Embodiments of Wearable Computing Apparatus

Additional alternative embodiments of wearable computing apparatus, and their respective operations, will now be described.

Figure 9:
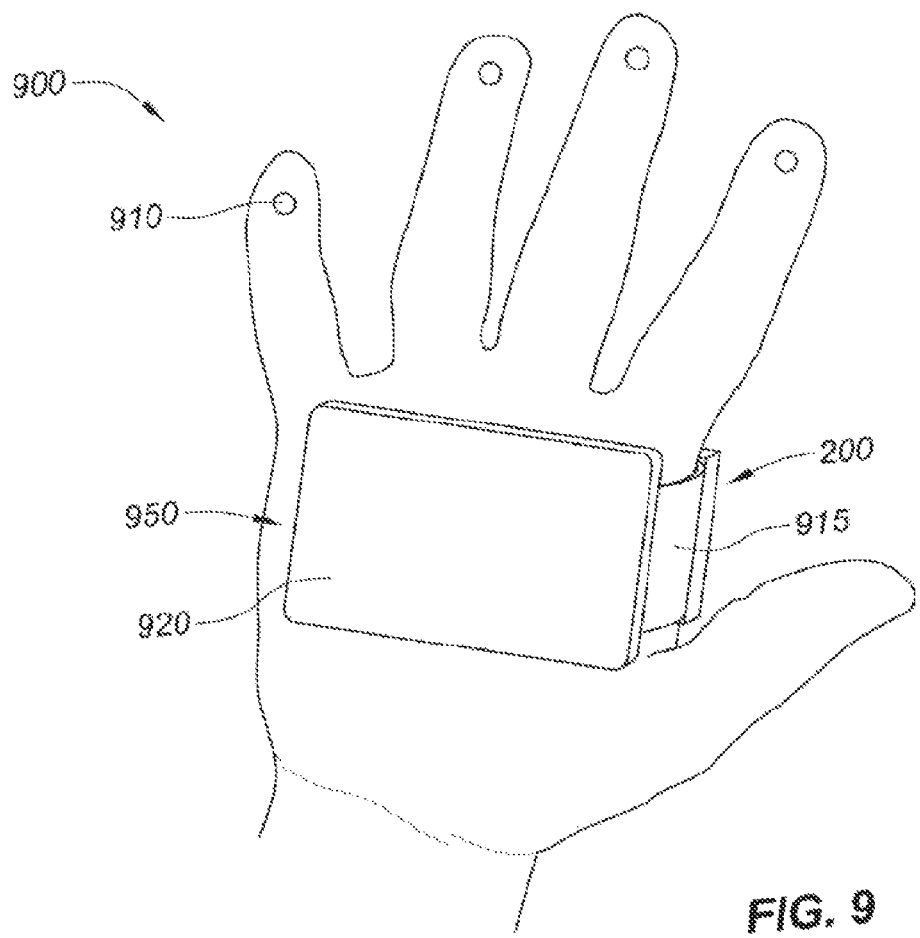
FIG. 9 is a drawing depicting a bottom view of another example embodiment of a wearable computing apparatus.

FIG. 9 is a drawing depicting a bottom view of another example embodiment of a wearable computing apparatus 900. In particular, according to one aspect of the embodiments, wearable computing apparatus 900 can be configured for one or more medical applications. For example, as can be seen in FIG. 9, wearable computing apparatus 900 includes first subassembly 200, which is configured to removably couple with second subassembly 950. According to one aspect of the embodiments, second subassembly 950 can comprise an adjustable strap 915 and a defibrillator pad 920 disposed on a portion of the adjustable strap 915 proximate to the palm. In most embodiments, defibrillator pad 920 can be configured to deliver a predetermined amount of electric current to a patient's heart. Furthermore, defibrillator pad 920 can be communicatively coupled to first subassembly 200 through a flexible lead embedded in the adjustable strap 915.

According to another aspect of the embodiments, other medical applications are also possible with respect to wearable computing apparatus 900. For example, either the first or second subassembly can include a temperature sensor or thermometer configured to read a patient's body temperature; a blood pressure sensor or blood pressure cuff configured to measure a patient's blood pressure; or an activity monitor configured to measure the activity of a patient during exercises, to name only a few.

Figure 10:
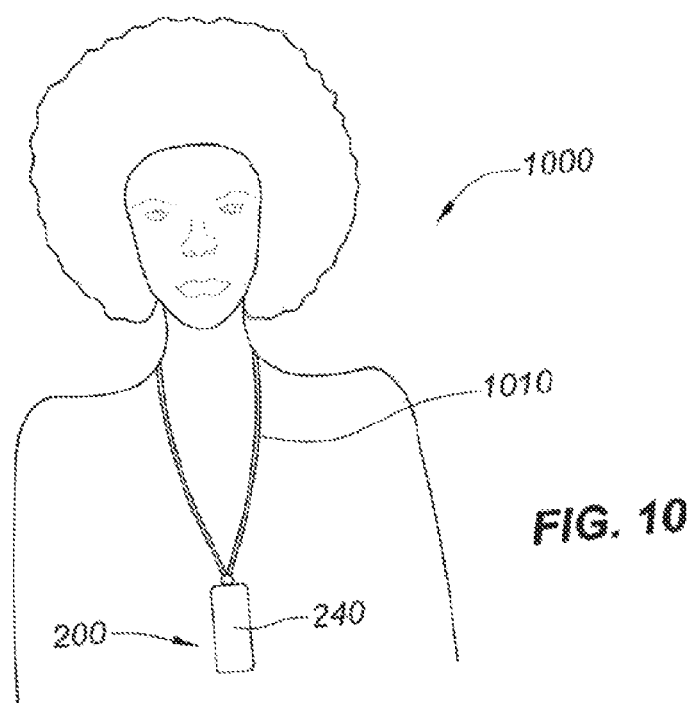
FIG. 10 is a drawing depicting a front view of another example embodiment of a wearable computing apparatus.

FIG. 10 is a drawing depicting a front view of another example embodiment of a wearable computing apparatus 1000. Wearable computing apparatus 1000 can comprise a first subassembly 200 having a display 240, microphone, speaker, wireless communications modules, etc. According to some embodiments described herein, first subassembly 200 can be worn as a pendant, such as on a chain 1010 around the user's neck. According to one aspect of these embodiments, wearable computing apparatus 1000 can be configured primarily to perform voice recognition routines, such as that described with respect to FIG. 5A.

Embodiments of Communications Between Two or More Wearable Computing Apparatuses Example embodiments of methods for communication between two or more wearable computing apparatuses, and their respective operations, will now be described. According to one aspect of the embodiments, two or more wearable computing apparatuses, each having one or more subassemblies, haptic motors and/or sensors, can be configured to communicate with each other through wired or wireless communications. In many of the embodiments described herein, one or more sensors of a first wearable computing apparatus can be configured to track a relative motion and/or position of the hand and fingers on which the first wearable computing apparatus is worn, and one or more haptic motors of a second wearable computing apparatus can be configured to generate a vibratory output, i.e., haptic feedback, to the user of the second wearable computing apparatus.

Figure 11A:
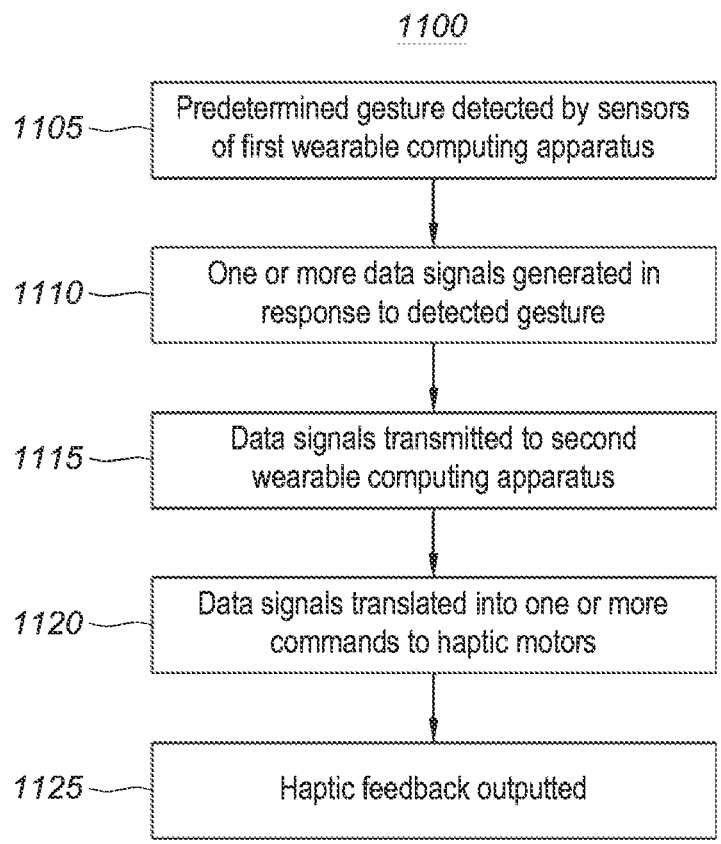
FIG. 11A is a flow diagram of an example embodiment of a method for communication between two or more wearable computing apparatuses.

FIG. 11A is a flow diagram of an example embodiment of a method 1100 for communication between two or more wearable computing apparatuses. As an initial matter, those of skill in the art will understand that the wearable computing apparatuses described herein can include any or all of the subassemblies and/or components described with respect to FIGS. 1, 2A, 2B, 3A-3E, 4, or any of the other wearable computing apparatuses described herein, and the routines and subroutines described herein comprise instructions stored in a non-transitory memory of a controller subassembly which, when executed by one or more processors, cause the one or more processors to perform the method steps of the described routines and subroutines.

Referring now to FIG. 11A, method 1100 begins at Step 1105 when one or more sensors of a first wearable computing apparatus detects one or more predetermined gestures by the user of the first wearable computing apparatus. In some embodiments, the one or more sensors can include one or more gyroscope sensors, accelerometers, magnetometers, or any of the other components configured to sense a hand/finger movement and/or position, as described with respect to FIGS. 2A, 2B, and 4. Additionally, in some embodiments, the one or more predetermined gestures can include a finger click, a finger tap, an open palm, a closed palm, one finger open, two fingers open, a playing of a note or a series of notes on a musical instrument (such as that described with respect to FIGS. 5B and 5C), or a sign language gesture (or series of sign language gestures) representing a word or sentence. Those of skill in the art will understand that the described predetermined gestures are provided by way of example only, and other movements, orientations, or positioning of the hand and/or one or more fingers are fully within the scope of the present disclosure.

At Step 1110, the one or more sensors of the first wearable computing apparatus generates one or more data signals in response to detecting the predetermined gestures. At Step 1115, the one or more data signals are transmitted wirelessly, via a wireless communication module, to a second wearable computing apparatus. In some embodiments, the one or more data signals can be transmitted wirelessly according to one or more of an 802.11x, Bluetooth, Bluetooth Low Energy, or Near Field Communication (NFC) protocol, or any other standard wireless networking protocol.

According to another aspect of the embodiments, a wireless communication module of the second wearable computing apparatus receives the transmitted one or more data signals. The second wearable computing apparatus can also include one or more haptic motors, one or more processors, and a memory coupled thereto. At Step 1120, instructions stored in memory of the second wearable computing apparatus are executed by the one or more processors, causing the one or more processors to translate the received one or more data signals into one or more commands sent to the one or more haptic motors. At Step 1125, a vibratory output, i.e., haptic feedback, is generated by the one or more haptic motors in response to the commands. According to some embodiments, the haptic feedback can be outputted to a predetermined target location of the second wearable computing apparatus that corresponds to a gesture location of the first wearable computing apparatus where the predetermined gesture was detected.

Although method 1100 depicts the transmission of the one or more data signals from the first wearable computing apparatus to the second wearable computing apparatus at Step 1115 before being translated into the one or more haptic motor commands at Step 1120, those of skill in the art will understand that the data signals can instead be translated into the one or more haptic motor commands at the first wearable computing apparatus before being transmitted to the second wearable computing apparatus. Furthermore, although the transmission of data signals and/or haptic motor commands are described as being performed wirelessly, those of skill in the art will appreciate that the data signals and/or haptic motor commands can also be transmitted via wired communications between the first wearable computing apparatus and the second wearable computing apparatus.

An example embodiment of method 1100 will now be described. A user of a first wearable computing apparatus makes a finger tap gesture with her index finger. The gesture is detected by one or more gyroscope sensors of the first wearable computing apparatus, and one or more data signals are generated in response thereto. Subsequently, the one or more data signals are wirelessly transmitted, via a wireless communication module of the first wearable computing apparatus, to a second wearable computing apparatus. The second wearable computing apparatus then receives the one or more data signals and programmatically generates a haptic feedback response to the index finger of the user of the second wearable computing apparatus.

Figure 11B:
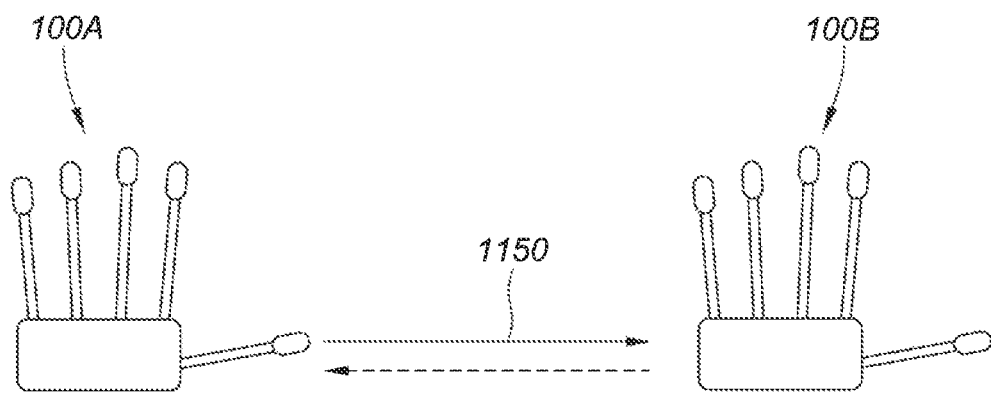
FIG. 11B is a data flow diagram of an example embodiment of a method for communications between two or more wearable computing apparatuses.

As can be seen in FIG. 11B, those of skill the art will recognize that the communication of data signals between first wearable computing apparatus 100A and the second wearable computing apparatus 100B can be either performed via a unidirectional communication link (solid directional arrow) or, optionally, a bidirectional communication link (dashed directional arrow) 1150. For example, according to some embodiments where inter-device communications are bidirectional, a predetermined gesture detected by the second wearable computing apparatus can also cause a haptic feedback response to be generated in the first wearable computing apparatus.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step may be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A wearable computing apparatus configured to be worn on a user's hand, the wearable computing apparatus comprising:
   a first subassembly, comprising:
      a housing including a top surface and at least one side surface, and a camera disposed on the at least one side surface;
      a first set of sensors configured to sense a plurality of positional characteristics associated with the user's hand;
      one or more processors;
      a non-transitory memory coupled to the one or more processors, the non-transitory memory for storing instructions; and
   a second subassembly configured to be coupled with the first subassembly, the second subassembly comprising:
      an adjustable strap configured to secure the second subassembly to the user's hand;
      a plurality of flexible leads coupled with a plurality of fingers on the user's hand, wherein each of the plurality of flexible leads is configured to be removably secured to a corresponding finger, and wherein the plurality of flexible leads comprises a second set of sensors configured to sense a plurality of positional characteristics associated with each of the plurality of fingers on the user's hand, and
      wherein the instructions stored in the non-transitory memory of the first subassembly, when executed by the one or more processors, cause the one or more processors to:
         detect signals received from the first set of sensors and determine a relative position of the user's hand,
         execute an object recognition subroutine comprising instructions to identify one or more objects in a line of sight of the camera, and generate a predetermined output and enable control of the identified one or more objects
         detect signals received from the second set of sensors and determine a relative position of each finger of the user's hand, and
         determine a pointer vector based on a relative position of at least one finger of the user's hand,
         wherein the instructions to identify the one or more objects in the line of sight of the camera further comprises instructions to identify the one or more objects along the pointer vector.

2. The wearable computing apparatus of claim 1, wherein the instructions stored in the non-transitory memory of the first subassembly, when executed by the one or more processors, further cause the one or more processors to:
   execute a gesture recognition subroutine comprising instructions to:
      detect a predefined gesture command based on the relative position of the user's hand, and
      initiate the object recognition subroutine based on the detected predefined gesture command.

3. The wearable computing apparatus of claim 1, wherein the predetermined output comprises initiating an app on the wearable computing apparatus or displaying a graphical user interface (GUI) of the app on a display based on the one or more identified objects.

4. The wearable computing apparatus of claim 1, wherein the predetermined output comprises establishing a wireless communications channel between the wearable computing apparatus and the one or more objects.

5. The wearable computing apparatus of claim 1, wherein the one or more objects comprises a television.

6. The wearable computing apparatus of claim 1, wherein the one or more objects comprises a computer display.

7. The wearable computing apparatus of claim 1, wherein the first subassembly further comprises at least one of a battery, a microphone, a Bluetooth or Bluetooth Low Energy module, and a wireless communication module.

8. The wearable computing apparatus of claim 1, wherein at least one of the first set of sensors and the second set of sensors comprises at least one of an accelerometer, a gyroscope sensor, and a magnetometer.

9. The wearable computing apparatus of claim 1, wherein the first subassembly further comprises a touchscreen display disposed on the top surface of the housing.

10. The wearable computing apparatus of claim 1, wherein the predetermined output comprises outputting audio from the one or more objects.

11. The wearable computing apparatus of claim 10, wherein the one or more objects comprises a speaker.

12. The wearable computing apparatus of claim 1, wherein the predetermined output comprises the printing a document from the one or more objects.

13. The wearable computing apparatus of claim 12, wherein the one or more objects comprises a printer.

14. The wearable computing apparatus of claim 1, wherein the predetermined output comprises movement of the one or more objects in a desired direction.

15. The wearable computing apparatus of claim 14, wherein the one or more objects comprises an unmanned vehicle or drone.

16. The wearable computing apparatus of claim 1, wherein the predetermined output comprises movement of the one or more objects in a desired manner.

17. The wearable computing apparatus of claim 16, wherein the one or more objects comprises one or more robotic arms.

* * * * *